United States Patent
Yamada et al.

(10) Patent No.: US 10,104,336 B2
(45) Date of Patent: Oct. 16, 2018

(54) IMAGE PROCESSING DEVICE, IMAGE DISPLAY DEVICE, IMAGE PROCESSING METHOD, AND IMAGE DISPLAY METHOD

(71) Applicant: SONY CORPORATION, Tokyo (JP)

(72) Inventors: Hideshi Yamada, Kanagawa (JP); Tomoo Mitsunaga, Kanagawa (JP); Kensei Jo, Kumamoto (JP); Tohru Kurata, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/521,761

(22) PCT Filed: Oct. 15, 2015

(86) PCT No.: PCT/JP2015/079215
§ 371 (c)(1),
(2) Date: Apr. 25, 2017

(87) PCT Pub. No.: WO2016/072238
PCT Pub. Date: May 12, 2016

(65) Prior Publication Data
US 2017/0251171 A1    Aug. 31, 2017

(30) Foreign Application Priority Data

Nov. 6, 2014 (JP) .................................. 2014-226037

(51) Int. Cl.
*G06K 9/00* (2006.01)
*H04N 7/08* (2006.01)
*H04B 10/116* (2013.01)

(52) U.S. Cl.
CPC ............. *H04N 7/08* (2013.01); *H04B 10/116* (2013.01)

(58) Field of Classification Search
CPC .............................. H04B 10/116; H04N 7/08
See application file for complete search history.

(56) References Cited

U.S. PATENT DOCUMENTS

2002/0047987 A1* 4/2002 Massengill ............ A61B 3/024
351/204

FOREIGN PATENT DOCUMENTS

| JP | 2004-328632 A | 11/2004 |
|---|---|---|
| JP | 2007-183461 A | 7/2007 |
| JP | 2013-223043 A | 10/2013 |
| JP | 2013-223047 A | 10/2013 |

OTHER PUBLICATIONS

Danakis, et al., "Using a CMOS Camera Sensor for Visible Light Communication", 3rd IEEE Workshop on Optical Wireless Communications (OWC'12), 2012, pp. 1244-1248.

* cited by examiner

*Primary Examiner* — Phuoc Tran
(74) *Attorney, Agent, or Firm* — Chip Law Group

(57) ABSTRACT

[Object] To provide an image processing device capable of outputting audio acquired as an audio data signal by capturing an arbitrary image. [Solution] Provided is an image processing device, including: a separation unit that separates a flicker pattern from an image obtained by capturing, at multiple exposure times, an image containing a scene that emits light on a basis of a flicker pattern converted from an audio signal; and a conversion unit that converts the separated flicker pattern to an original audio signal.

20 Claims, 21 Drawing Sheets

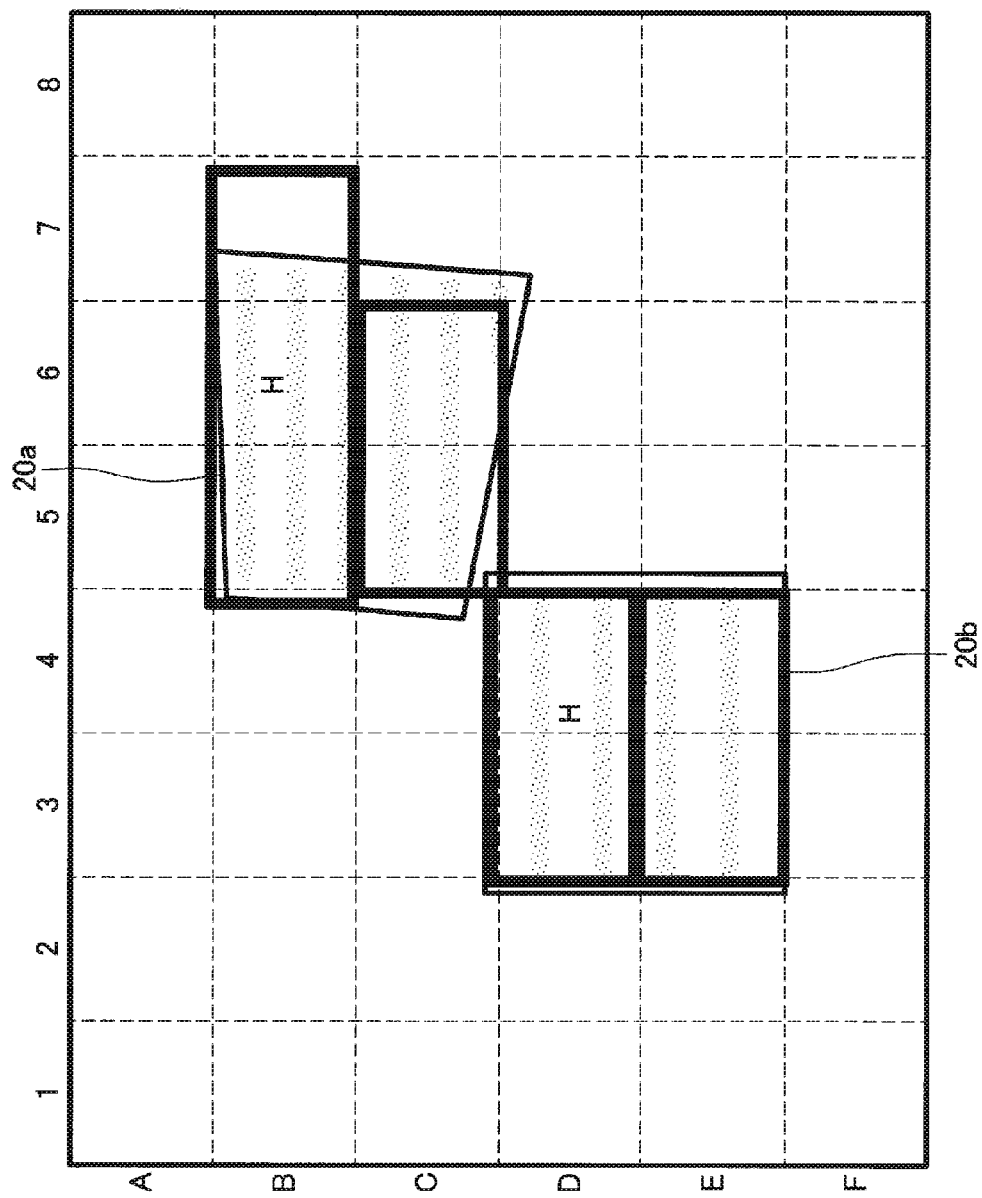

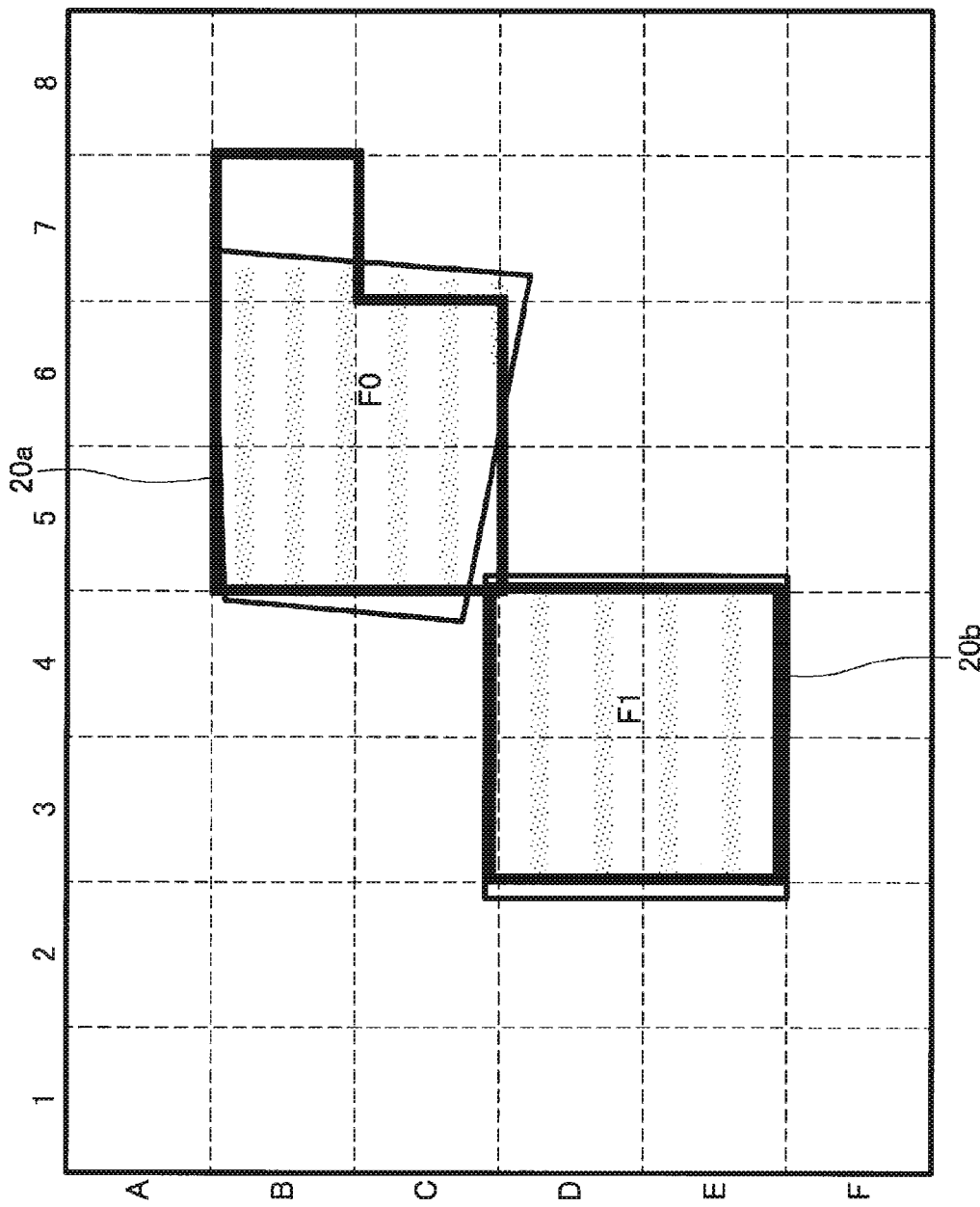

IMAGE PROCESSING DEVICE, IMAGE DISPLAY DEVICE, IMAGE PROCESSING METHOD, AND IMAGE DISPLAY METHOD

CROSS REFERENCE TO RELATED APPLICATIONS

This application is a U.S. National Phase of International Patent Application No. PCT/JP2015/079215 filed on Oct. 15, 2015, which claims priority benefit of Japanese Patent Application No. JP 2014-226037 filed in the Japan Patent Office on Nov. 6, 2014. Each of the above-referenced applications is hereby incorporated herein by reference in its entirety.

TECHNICAL FIELD

The present disclosure relates to an image processing device, an image display device, an image processing method, and an image display method.

BACKGROUND ART

As a method of transmitting transmission data from a transmission device to a reception device, there is a method of opto-spatially transmitting the transmission data with light (in other words, an optical signal), for example. For example, Patent Literature 1 discloses a technology that merges the function of an optical signal transmitter with the backlight of a liquid crystal display, and opto-spatially transmits music data to headphones equipped with a dedicated receiver with light emitted from the liquid crystal display.

CITATION LIST

Patent Literature

Patent Literature 1: JP 2004-328632A

DISCLOSURE OF INVENTION

Technical Problem

Given the above circumstances, there is demand to opto-spatially transmit transmission data with a simpler configuration, without using a dedicated receiver.

Accordingly, the present disclosure proposes a new and improved image processing device, image display device, image processing method, and image display method capable of outputting audio acquired as an audio data signal by capturing an arbitrary image.

Solution to Problem

According to the present disclosure, there is provided an image processing device, including: a separation unit that separates a flicker pattern from an image obtained by capturing, at multiple exposure times, an image containing a scene that emits light on a basis of a flicker pattern converted from an audio signal; and a conversion unit that converts the separated flicker pattern to an original audio signal.

According to the present disclosure, there is provided an image display device, including: a delay unit that delays an image signal by a certain delay time; a flicker pattern conversion unit that converts, into a flicker pattern, an audio signal with attached information about the delay time by which the delay unit delays; and an image display unit that displays an image based on an image signal delayed by the delay unit, while also causing a backlight to emit light on a basis of the flicker pattern converted by the flicker pattern conversion unit.

According to the present disclosure, there is provided an image processing method, including: separating a flicker pattern from an image obtained by capturing, at multiple exposure times, an image containing a scene that emits light on a basis of a flicker pattern converted from an audio signal; and converting the separated flicker pattern to an original audio signal.

According to the present disclosure, there is provided an image display method, including: delaying an image signal by a certain delay time; converting, into a flicker pattern, an audio signal with attached information about the delay time by which to delay; and displaying an image based on the delayed image signal, while also causing a backlight to emit light on a basis of the converted flicker pattern.

Advantageous Effects of Invention

According to the present disclosure as described above, it is possible to provide a new and improved image processing device, image display device, image processing method, and image display method capable of outputting audio acquired as an audio data signal by capturing an arbitrary image.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 20 is an explanatory diagram illustrating an example of extracting a flicker pattern.

FIG. 21 is an explanatory diagram illustrating an example of extracting a flicker pattern.

MODE(S) FOR CARRYING OUT THE INVENTION

Figure 1:
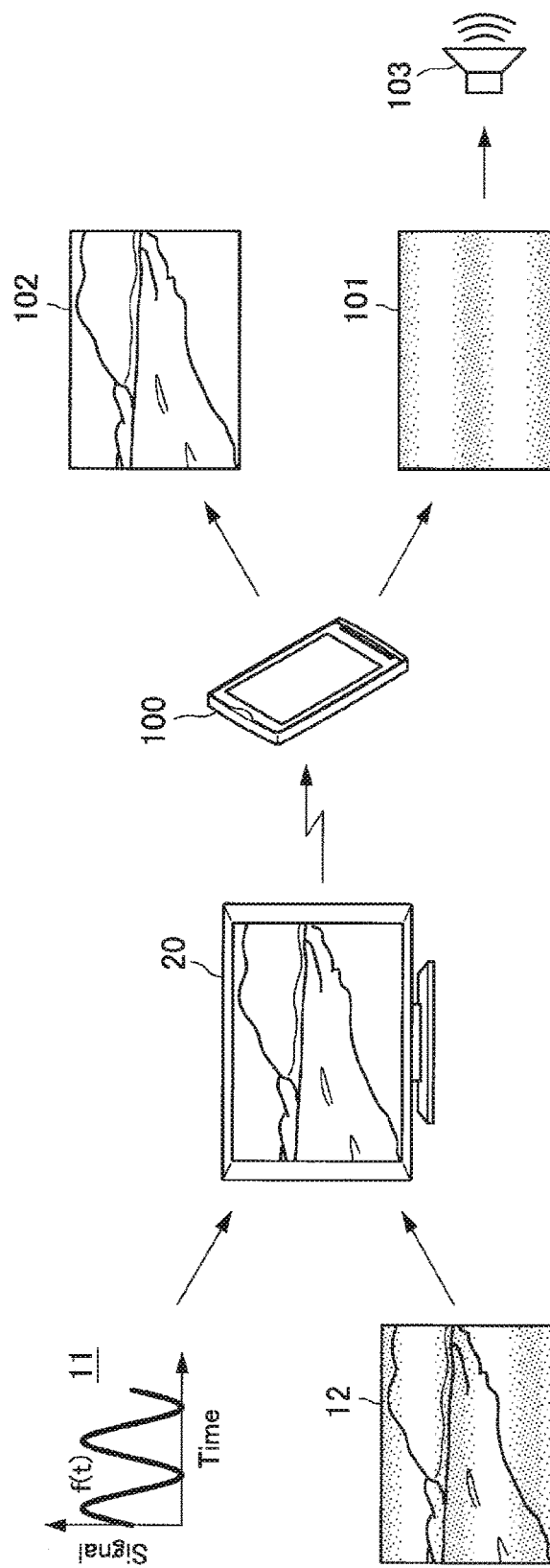
FIG. 1 is an explanatory diagram illustrating an overview of an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

1. Embodiment of present disclosure
1.1. Background
1.2. Overview
1.3. Example configuration and example operations
1.4. Modifications
1.5. Example use cases
2. Conclusion

1. EMBODIMENT OF PRESENT DISCLOSURE

1.1. Background

As discussed above, as a method of transmitting transmission data from a transmission device to a reception device, there is a method of opto-spatially transmitting the transmission data with an optical signal, for example.

In the related art, there exist infrared wireless headphones as a product using technology that transmits audio data by visible light communication for playback on a reception terminal side. Such infrared wireless headphones are equipped with a transmitter that transmits audio data as an infrared signal and a receiver that receives the infrared signal on the headphones side, enabling one to enjoy audio playback from the headphones wirelessly, within the range reached by infrared.

There is demand for technology enabling transmission data to be opto-spatially transmitted from a transmission device to a reception device with an even simpler configuration and more easily. For example, Patent Literature 1 discloses a technology that merges the function of an optical signal transmitter with the backlight of a liquid crystal display, and opto-spatially transmits music data to headphones equipped with a dedicated receiver with light emitted from the liquid crystal display.

However, with the method disclosed in Patent Literature 1, when receiving music data with headphones by light emitted from a liquid crystal display, it is necessary to provide a dedicated receiver in the headphones, and pairing between the transmitting side and the receiving side must also be performed in advance. For this reason, it has been difficult for a user to casually enjoy opto-spatial transmission of music data.

Accordingly, as a method of conducting opto-spatial communication with an simpler method, a method has been proposed in which visible light communication is realized not by using a device including a dedicated receiver, but instead by using the camera of a mobile terminal such as a smartphone. For example, with the technology proposed at http://research.nokia.com/lightspeak, transmission data is carried on a signal transmitted to the light source of a display, recorded as a picture by a rolling shutter operation of an image sensor, and by separating a flicker component, that is, the transmission data, from the recorded picture data and obtaining the transmission data from the flicker component, the transmission data from the transmission device is received.

Visible light communication using the camera of a mobile terminal has the merits of enabling visible light communication with an image sensor which is provided in the mobile terminal and which performs a rolling shutter operation, enabling a communication protocol to be established and transfer to be started by simply pointing the camera at the light source to capture, and also being secure than wireless communication by Wi-Fi or the like, since communication is conducted only within the range reached by light.

However, with visible light communication using the camera of a mobile terminal, in order to reliably separate the flicker component, that is, the transmission data, from the picture data, in the related art, the picture to capture with the mobile terminal must be a nearly-flat subject, which limits the scenarios in which the technology may actually be used.

Accordingly, the authors of the present disclosure conducted a thorough investigation into technology capable of reliably separating the flicker component, that is, the transmission data, from the picture data no matter what kind of picture is captured, and converting the flicker component into audio data to thereby transmit audio data between a transmission device and a reception device. As a result, the authors of the present disclosure devised a technology capable of separating an arbitrary picture and an audio data signal attached to the picture with a simple method, and playing back audio associated with the picture on the mobile terminal that captures the picture.

The above thus describes the background of an embodiment of the present disclosure. Next, an overview of an embodiment of the present disclosure will be described.

1.2. Overview

FIG. 1 is an explanatory diagram illustrating an overview of an embodiment of the present disclosure. FIG. 1 illustrates an overview of the embodiment of the present disclosure, in which an image of a display displaying an arbitrary picture is captured by a mobile terminal, and an audio data signal is extracted from picture data obtained by the image capture.

In the present embodiment, an audio data signal 11 to transmit is impressed as flicker onto the backlight of a display 20 displaying an arbitrary picture 12 or a light source illuminating an arbitrary background. A camera of an audio playback terminal 100 is equipped with an image sensor having a spatially multiplexed exposure (SME) function, and captures an arbitrary picture 12 with a rolling shutter operation of the image sensor. The spatially multiplexed exposure function is a function that divides pixels into two exposure groups for short exposure and long exposure to enable simultaneous capture.

The audio playback terminal 100 may be realized by equipment that may be provided with a camera, such as a smartphone or other type of mobile phone, a game console, a music playback device, a head-mounted display (HMD), or smart glasses, for example. The audio playback terminal 100 captures the arbitrary picture 12 with the camera, and is able to separate the picture data obtained by the image capture into a flicker pattern 101 and an original picture (playback image 102). Subsequently, the audio playback terminal 100 converts the flicker pattern 101 obtained by the separation into audio data, and outputs playback audio 103 based on the audio data.

With the technique according to the present embodiment, capturing a picture with the audio playback terminal 100 equipped with an image sensor having a spatially multiplexed exposure function has the merit of allowing the picture 12 to capture to be arbitrary. With the technique according to the present embodiment, visible light communication may be conducted using patterns that are invisible to humans, thereby yielding advantageous effects such as allowing the picture to capture to be arbitrary, and enabling a communication protocol to be established by simply capturing an image with the display or object of the transmission source contained in the field of view. There is also a merit of enabling a user to enjoy the simultaneous playback of a picture and audio simply by pointing the camera of the audio playback terminal 100 at the transmission source.

At this point, a method of separating a flicker pattern from picture data captured by an audio playback terminal 100 equipped with an image sensor having a spatially multiplexed exposure function will be described.

The visible light communication display 20 in FIG. 1 decodes and displays a picture on a screen, while also adjusting the backlight brightness on the basis of an audio data signal. In the emitted light from the visible light communication display 20, backlight brightness changes based on the audio data signal are carried on the brightness changes of the picture.

Figure 2:
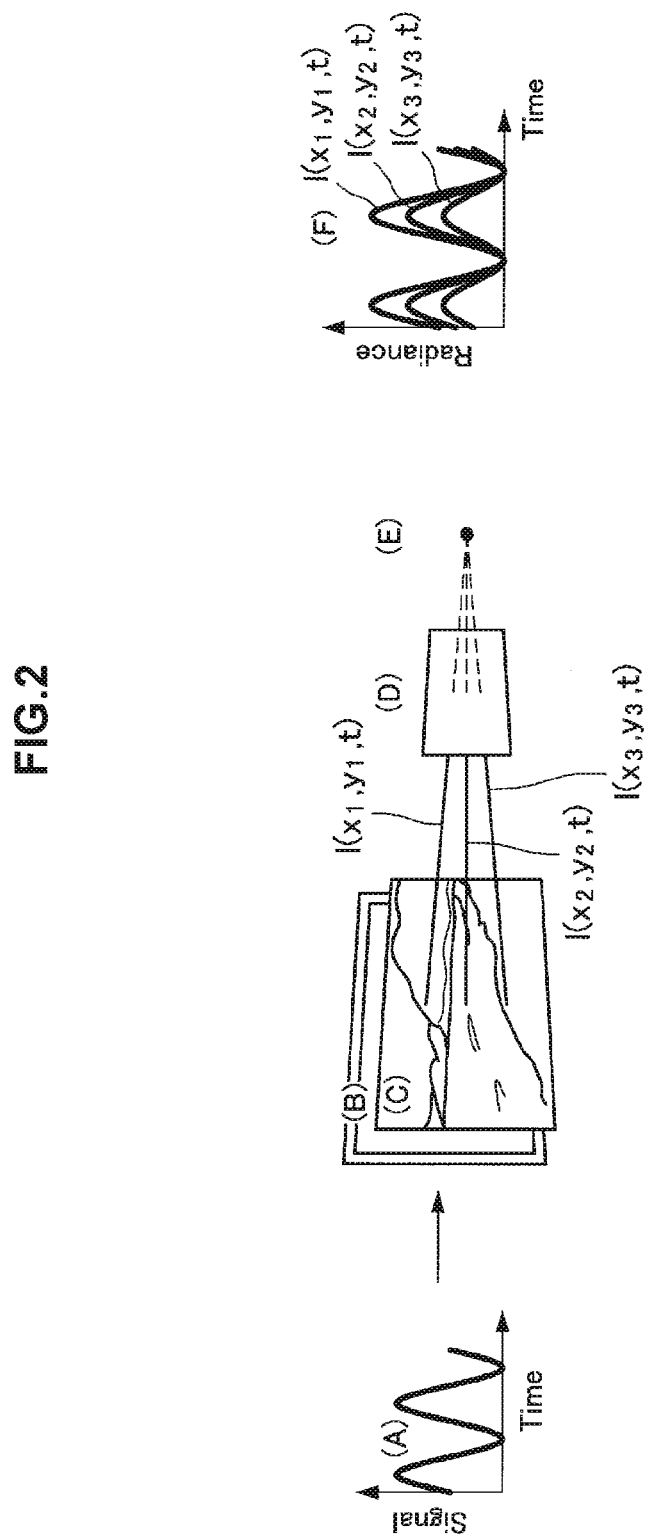
FIG. 2 is an explanatory diagram illustrating how an image of a visible light communication display 20 is captured.

FIG. 2 is an explanatory diagram illustrating the image capture of the visible light communication display 20 that is emitting light in which backlight brightness changes based on an audio data signal are carried on the brightness changes of the picture. FIG. 2 illustrates an example for the case of capturing the visible light communication display 20 with a pinhole camera, for example.

The picture that may be captured with a pinhole camera may be expressed as a cross-section view of when the light rays passing through the pinhole (D) pass through a virtual imaging plane (E) positioned before the pinhole. As illustrated in FIG. 2, when the imaging plane of the pinhole camera is placed directly facing the display, the pinhole camera is able to obtain, as a picture, a cross-section resembling the light-emitting screen of the display.

Since the backlight (B) varies the overall brightness of the light-emitting screen (C) at the same time, brightness changes in the captured picture vary simultaneously, irrespective of location. Additionally, the time variation in the brightness changes is proportional (F) to the variation of an encoded audio data signal (A).

In this way, the brightness of the light emitted from the display varies over time, but speed of variation in the brightness of the light is set to be faster than the time response speed of the human eye. Consequently, if a human views the displays, variations in the brightness of the light emitted from the display become integrated and unnoticeable to the human.

Figure 3:
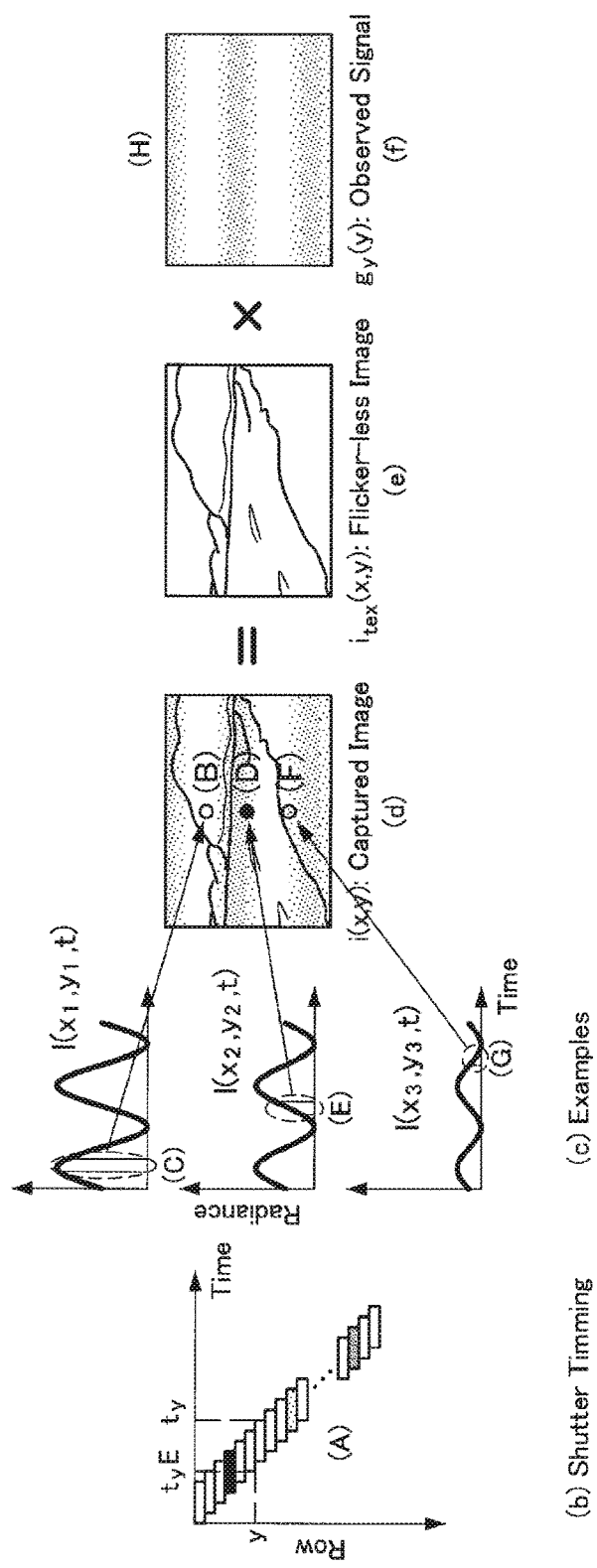
FIG. 3 is an explanatory diagram that describes a method of separating a flicker pattern from picture data.

FIG. 3 is an explanatory diagram that describes a method of separating a flicker pattern from picture data. The audio playback terminal 100 includes a built-in camera using a complementary MOS (CMOS) image sensor. An ordinary CMOS image sensor reads out signals measured by pixels with a rolling shutter operation. A rolling shutter operation is a method of performing readout control while shifting the timing slightly for each row (A).

Consequently, in an image captured using the CMOS image sensor, the interval (C) during which is exposed the pixel (B) on a line in the upper part of the frame, the interval (E) during which is exposed the pixel (D) on a line near the center, and the interval (G) during which is exposed the pixel (F) on a line in the lower part, are different from each other.

As a result, even though the brightness varies at the same timings uniformly all over the screen in the picture emitted from the display of the audio playback terminal 100, the brightness variation is observed as a pattern of horizontal stripes (H) in the picture captured by the camera. These horizontal stripes are produced by the rolling shutter operation of the image sensor. Consequently, in the captured picture, a stripe pattern always occurs in the horizontal direction, regardless of the relative positional relationship between the display and the camera of the audio playback terminal 100. If this characteristic of brightness variations being observed as a horizontal stripe pattern is utilized, the original picture depicted on the display of the audio playback terminal 100 and the audio data signal may be separated.

In the present embodiment, the visible light communication display 20 is captured using a CMOS image sensor that includes a spatially multiplexed exposure function having a mechanism that captures an image by changing the exposure time for each row or each pixel. By capturing the visible light communication display 20 using a CMOS image sensor that includes a spatially multiplexed exposure function, an arbitrary picture and an audio data signal may be separated from an image carrying both of the above.

Figure 4:
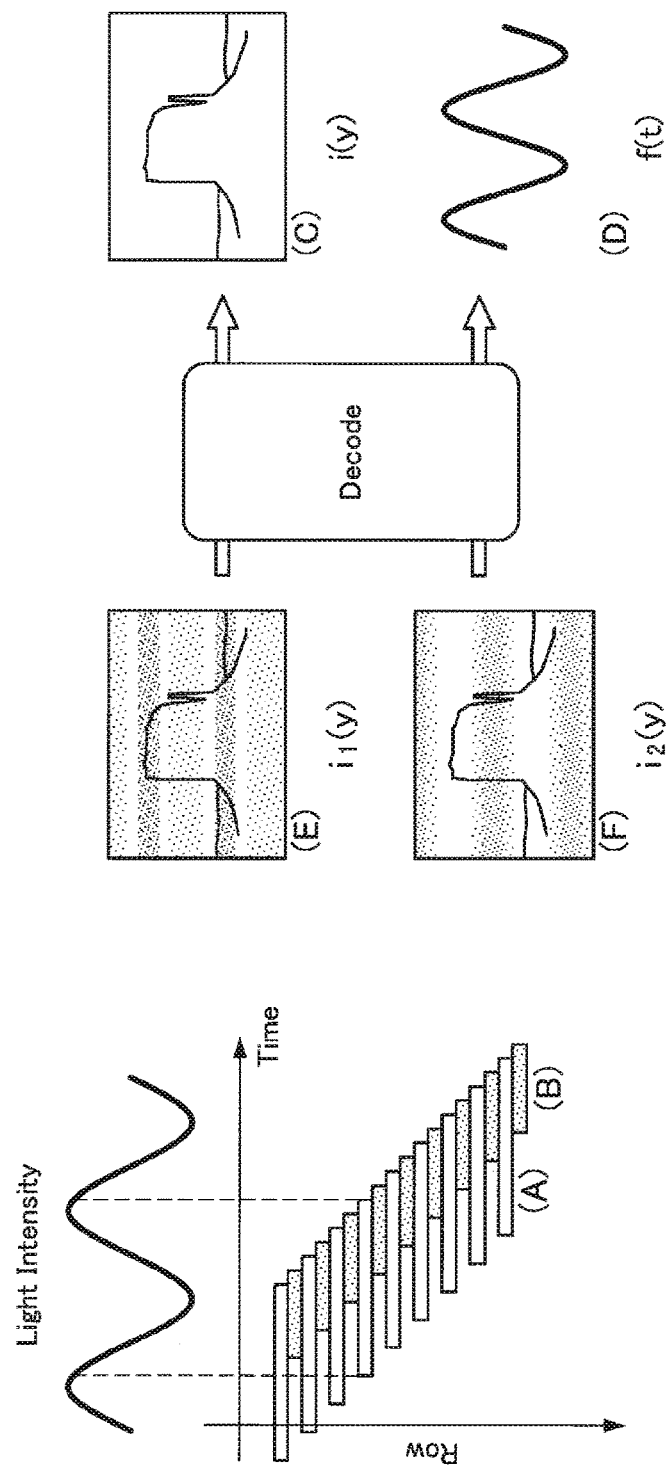
FIG. 4 is an explanatory diagram that describes a method of separating a flicker pattern from picture data.

FIG. 4 is an explanatory diagram that describes a method of separating a flicker pattern from picture data. For example, as illustrated in FIG. 4, suppose that an image sensor in which a line that conducts a first exposure (A) and a line that conducts a second exposure (B) are close to each other is used to capture a picture carrying an encoded audio data signal (D) in a picture (C) of an arbitrary background.

Since the intervals of exposure are different between an image i_1 (E) constructed by assembling pixels of the first exposure (A) and an image i_2 (F) constructed with pixels of the second exposure (B), the ways in which the time variation of the audio data signal is integrated are also different. As a result of the different ways in which the time variation of the audio data signal is integrated, the horizontal stripe patterns appearing in the images are also different. These may be expressed numerically by the following formulas.

$$i_1(y) = \{s_1(t) * f(t)\} \cdot i(y)$$

$$i_2(y) = \{s_2(t) * f(t)\} \cdot i(y) \qquad \text{[Math. 1]}$$

The value i(y) (where y is an index of the horizontal line) obtained by integrating pixels in the horizontal line direction may be expressed by the above formulas using a shutter function s(t), an audio data signal f(t), and an arbitrary picture i. The shutter function s(t) is known. Note that signals are handled after performing integration in units of lines, the image is taken to be a function only of the position y in the vertical direction.

At this point, provided that the first exposure is a integer multiple of the brightness variation cycle of the audio data signal, and the variations are cancelled out when integrated over the exposure interval, the following relationship holds.

$$i_1(y) = k \cdot i(y) \rightarrow \frac{i_2(y)}{i_1(y)} = \{s_2(t) * f(t)\} \cdot \frac{1}{k} \quad [\text{Math. 2}]$$

If this formula is converted to a matrix representation and a pseudo-inverse matrix $S\hat{}+$ of S is applied to both sides, the audio data signal f may be computed, albeit with a unknown scaling coefficient k remaining.

Consequently, by using an image sensor having a spatially multiplexed exposure function to capture the visible light communication display 20 having a backlight that emits light on the basis of a flicker pattern generated from audio data, the audio playback terminal 100 becomes able to separate the flicker pattern from the captured image, and obtain an audio data signal from the flicker pattern. In other words, by simply causing the audio playback terminal 100 equipped with an image sensor having a spatially multiplexed exposure function to capture the visible light communication display 20 having a backlight that emits light on the basis of a flicker pattern generated from audio data, it becomes possible to receive audio data from the visible light communication display 20 by visible light communication.

The above thus describes a method of separating a flicker pattern from picture data captured by an audio playback terminal 100 equipped with an image sensor having a spatially multiplexed exposure function.

1.3. Example Configuration and Example Operations

Next, an example configuration of a visible light system according to an embodiment of the present disclosure, as well as an example configuration and example operations of a visible light communication display 20 and an audio playback terminal 100 constituting such a system, will be described.

Figure 5:
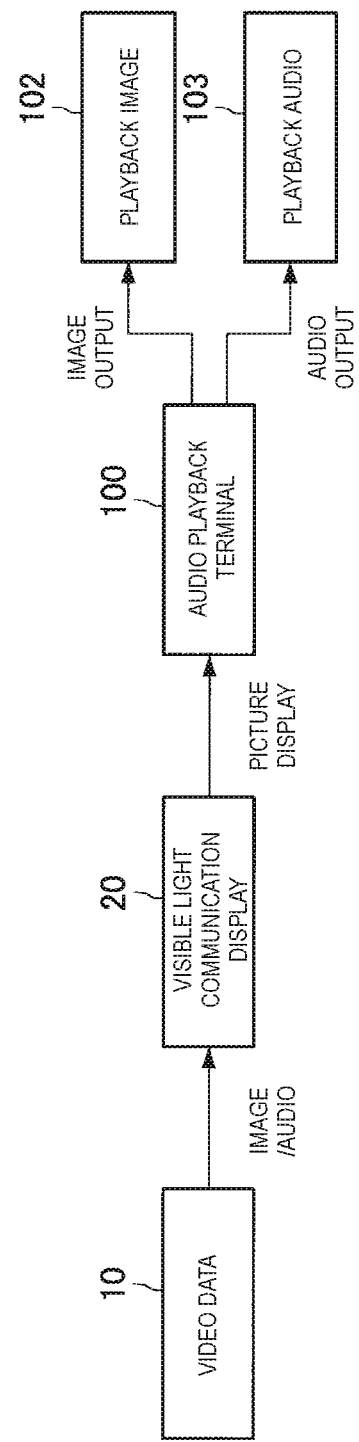
FIG. 5 is an explanatory diagram illustrating an example configuration of a visible light communication system according to an embodiment of the present disclosure.

First, an example configuration of a visible light communication system according to an embodiment of the present disclosure will be described. FIG. 5 is an explanatory diagram illustrating an example configuration of a visible light communication system according to an embodiment of the present disclosure. FIG. 5 illustrates an example configuration of a visible light communication system that transmits audio data by visible light communication. Hereinafter, an example configuration of a visible light communication system according to an embodiment of the present disclosure will be described using FIG. 5.

As illustrated in FIG. 5, a visible light communication system according to an embodiment of the present disclosure is configured to include a visible light communication display 20 and an audio playback terminal 100.

The visible light communication display 20 is a display device provided with a backlight, such as a liquid crystal display. The visible light communication display 20 is a display intended to transmit audio data via visible light communication, by converting audio data into a flicker pattern, and flashing the backlight on the basis of the flicker pattern. The configuration of the visible light communication display 20 will be discussed in detail later, but the functions of the visible light communication display 20 are briefly described below.

When arbitrary video data 10 is supplied to the visible light communication display 20, the visible light communication display 20 separates the video data 10 into picture data and audio data. Subsequently, the visible light communication display 20 converts the audio data into a flicker pattern, and displays a picture on the basis of the picture data, while also flashing the backlight on the basis of the flicker pattern.

The audio playback terminal 100 is a device that extracts audio data from picture data obtained by capturing the picture displayed on the visible light communication display 20, and performs the display of a playback image 102 based on the picture data, and the output of playback audio 103 based on the audio data. The configuration of the audio playback terminal 100 will be discussed in detail later, but the functions of the audio playback terminal 100 are briefly described below.

The audio playback terminal 100 separates picture data obtained by capturing the picture displayed on the visible light communication display 20 into a flicker-less image and a flicker signal that acts as communication data. Subsequently, the audio playback terminal 100 converts the flicker signal into audio data, and performs the display of a playback image 102 based on the picture data, and the output of playback audio 103 based on the audio data.

A visible light communication system according to an embodiment of the present disclosure, by having a configuration as illustrated in FIG. 5, enables visible light communication of audio data by a pictured displayed on the visible light communication display 20.

The above thus describes an example configuration of a visible light communication system according to an embodiment of the present disclosure using FIG. 5.

Next, an exemplary functional configuration of the visible light communication display 20 constituting a visible light communication system according to an embodiment of the present disclosure will be described.

Figure 6:
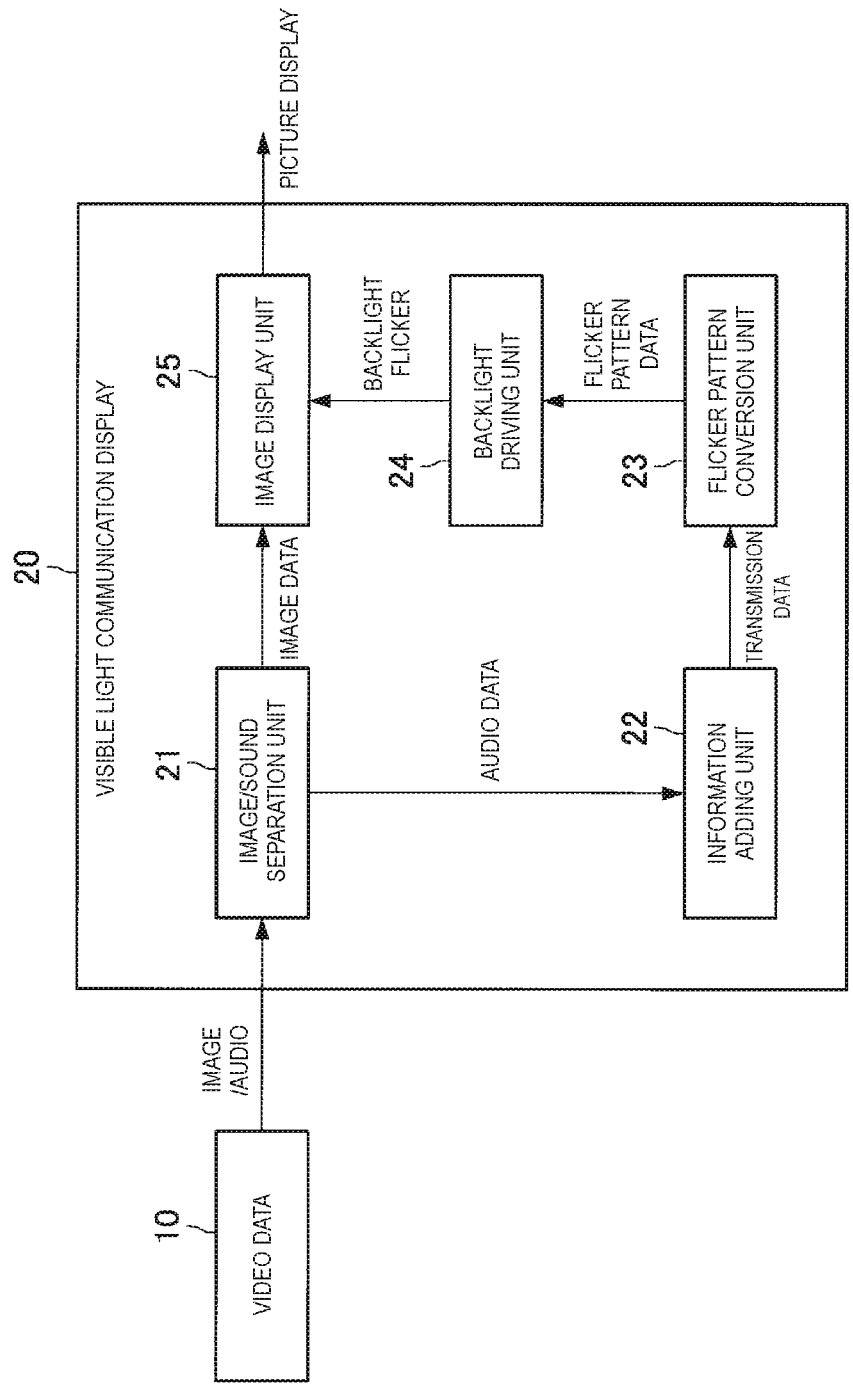
FIG. 6 is an explanatory diagram illustrating an exemplary functional configuration of a visible light communication display 20.

FIG. 6 is an explanatory diagram illustrating an exemplary functional configuration of a visible light communication display 20. Hereinafter, an exemplary functional configuration of the visible light communication display 20 will be described using FIG. 6.

As illustrated in FIG. 6, the visible light communication display 20 is configured to include an image/sound separation unit 21, an information adding unit 22, a flicker pattern conversion unit 23, a backlight driving unit 24, and an image display unit 25.

The image/sound separation unit 21 separates video data 10 input into the visible light communication display 20 into image data and audio data. The image/sound separation unit 21 outputs the image data to the image display unit 25, and transmits the audio data to the information adding unit 22.

The video data 10 may be data of any format typically used on a PC or the like, such as MPEG or AVI. Also, the audio data may be in an arbitrary format, and may be AM-modulated or FM-modulated WAV format data or MPEG3-converted data. Furthermore, rather than direct audio data, the audio data may also be in a format such as MIDI in which sound source playback information is recorded. In cases in which the audio data is in MIDI format, in the audio playback terminal 100 receiving the audio data, audio is played back by a certain sound source on the basis of the audio data.

The information adding unit 22 adds additional information required for visible light communication with the audio playback terminal 100 to the audio data output by the image/sound separation unit 21, thereby converting the audio data into transmission data. After converting the audio data into transmission data, the information adding unit 22 delivers the transmission data to the flicker pattern conversion unit 23.

The additional information that the information adding unit 22 adds to the audio data is information including header information, a terminal symbol, and the like, for example. The header information indicates the beginning of the audio data, and is used by the audio playback terminal 100 on the receiving side to decide the starting horizontal position of the received data. The header information may include, for example, a "data identification ID" such as 0x01 that indicates audio data, a "data length size" that indicates the length of the data as a number of bytes, and the like. The terminal symbol may include a "data end mark" such as 0xFA. Obviously, the "data identification ID" and the "data end mark" are not limited to the examples given here.

The flicker pattern conversion unit 23 receives transmission data from the information adding unit 22, and converts the transmission data into flicker pattern data required to drive the backlight of the image display unit 25. After converting the transmission data into flicker pattern data, the flicker pattern conversion unit 23 supplies the flicker pattern data to the backlight driving unit 24.

When converting transmission data into a flicker pattern signal, the flicker pattern conversion unit 23 uses phase shift keying (PSK), for example. Phase shift keying is a digital modulation scheme that transmits data by modulating or varying the phase of a base signal (carrier wave) such as a sine wave.

When performing conversion using phase shift keying, the flicker pattern conversion unit 23 incorporates a pilot signal into the carrier wave, and synchronizes the start position. The pilot signal is a signal of a pattern predetermined for transmission and reception, and is used on the receiving side to estimate a channel (the amounts of attenuation and phase rotation) from the received signal and the like. Also, by periodically incorporating a pilot signal into the delivery signal, the transmitting side is able to indicating the beginning of information partitioned into frames or the like, and the pilot signal is used to detect where a frame begins in the transmission data. The receiving side is able to decode received data by treating the periodic pilot signal intervals as units of individual frames.

The backlight driving unit 24 receives flicker pattern data from the flicker pattern conversion unit 23, and causes the backlight of the image display unit 25 to flicker on the basis of the flicker pattern data.

The image display unit 25 is made up of a display provided with a backlight, such as a liquid crystal display. The image display unit 25 displays image data input from the image/sound separation unit 21. Also, the flickering of the backlight when the image display unit 25 displays image data is controlled by the backlight driving unit 24.

The above thus describes an exemplary functional configuration of the visible light communication display 20 using FIG. 6. The visible light communication display 20, by having a configuration as illustrated in FIG. 6, enables visible light communication using an arbitrary picture.

Note that the visible light communication display 20 illustrated in FIG. 6 separates video data 10 into image data and audio data, and converts the audio data into a flicker pattern, but the present disclosure is not limited to such an example. The audio data that acts as the basis of the flicker pattern may also be independent from the video data 10.

Figure 7:
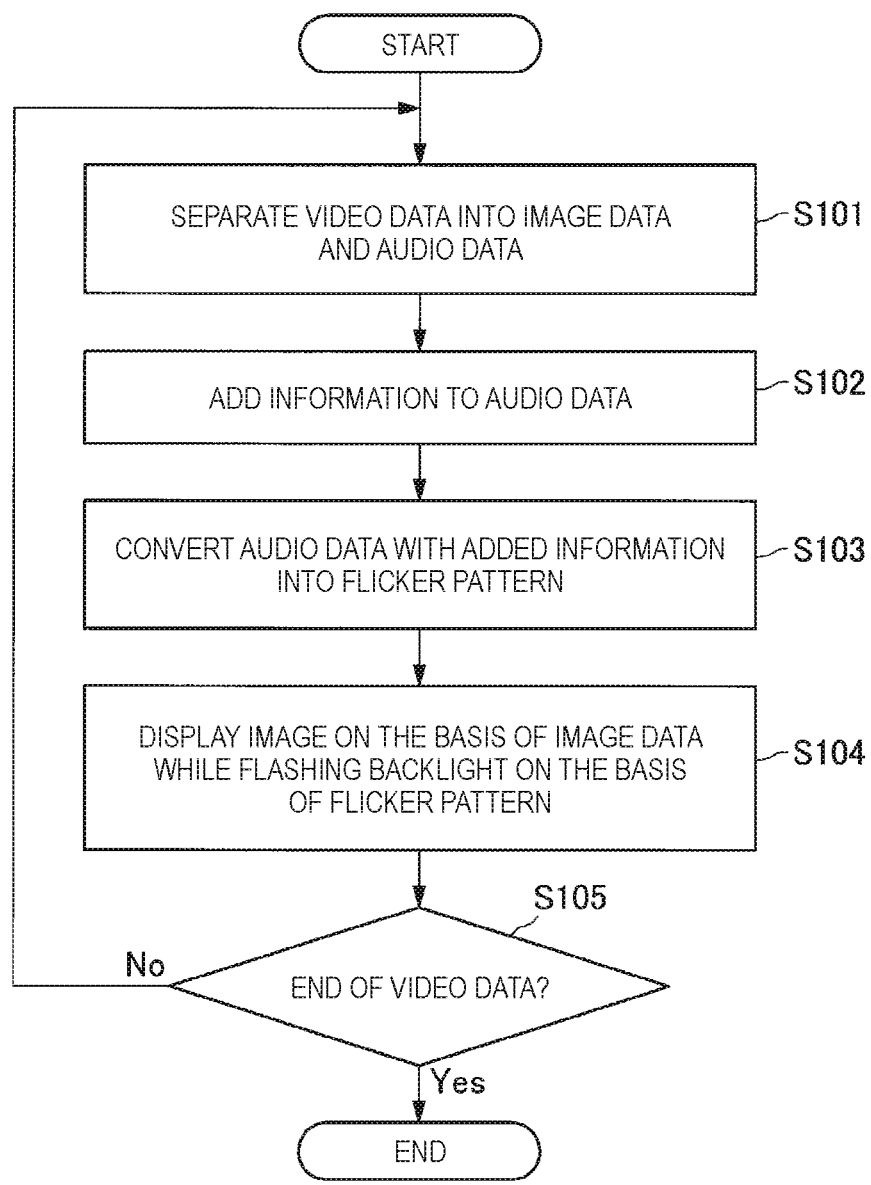
FIG. 7 is a flowchart illustrating example operations of a visible light communication display 20.

Next, example operations of the visible light communication display 20 will be described. FIG. 7 is a flowchart illustrating example operations of the visible light communication display 20. FIG. 7 illustrates example operations of the visible light communication display 20 when transmitting audio data by visible light communication using an arbitrary picture. Hereinafter, example operations of the visible light communication display 20 will be described using FIG. 7.

The visible light communication display 20 separates input video data into image data and audio data in the image/sound separation unit 21 (step S101). After separating the video data into image data and audio data, next the visible light communication display 20 adds information required for visible light communication to the audio data in the information adding unit 22 (step S102). The information added to the audio data in step S102 is information including header information and a terminal symbol, and the like, for example, as discussed earlier.

After adding the information required for visible light communication to the audio data, next the visible light communication display 20 converts the transmission data into flicker pattern data in the flicker pattern conversion unit 23 (step S103). For the conversion from transmission data to flicker pattern data in step S103, phase shift keying is used, as discussed earlier.

Figure 8:
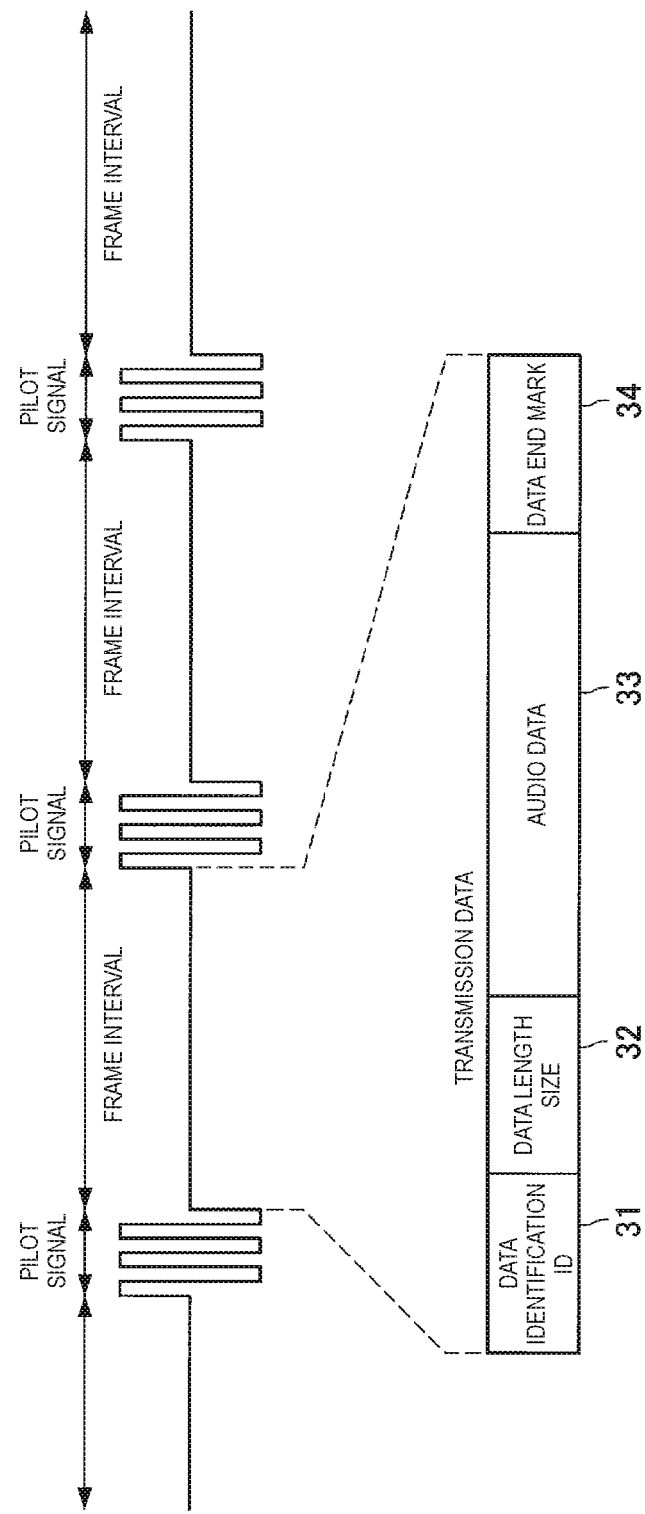
FIG. 8 is an explanatory diagram illustrating an example conversion from transmission data to flicker pattern data.

FIG. 8 is an explanatory diagram illustrating an example conversion from transmission data to flicker pattern data by the visible light communication display 20. When converting from transmission data to flicker pattern data, the visible light communication display 20 incorporates a pilot signal into the carrier wave, and synchronizes the start position, as illustrated in FIG. 8. The visible light communication display 20 incorporates transmission data into frame intervals existing between pilot signals. The transmission data includes a data identification ID 31, a data length size 32, audio data 33, and a data end mark 34, for example. By incorporating a pilot signal in this way, the transmitting side, or in other words the visible light communication display 20, is able to indicate the beginning of information partitioned into frames or the like. Also, the receiving side, or in other words the audio playback terminal 100, is able to decode received data by treating the periodic pilot signal intervals as units of individual frames.

After converting the transmission data into flicker pattern data, next the visible light communication display 20 displays an image on the image display unit 25 on the basis of the image data, while also flashing the backlight of the image display unit 25 on the basis of the flicker pattern (step S104). Additionally, if the video data has not ended (step S105, No), the visible light communication display 20 returns to the separation process in step S101, whereas if the video data ends (step S105, Yes), the visible light communication display 20 ends the processing sequence.

The above thus describes example operations of the visible light communication display 20 using FIG. 7. The visible light communication display 20, by executing a series of operations as illustrated in FIG. 7, enables visible light communication using an arbitrary picture.

Next, an exemplary functional configuration of the audio playback terminal 100 constituting a visible light communication system according to an embodiment of the present disclosure will be described.

Figure 9:
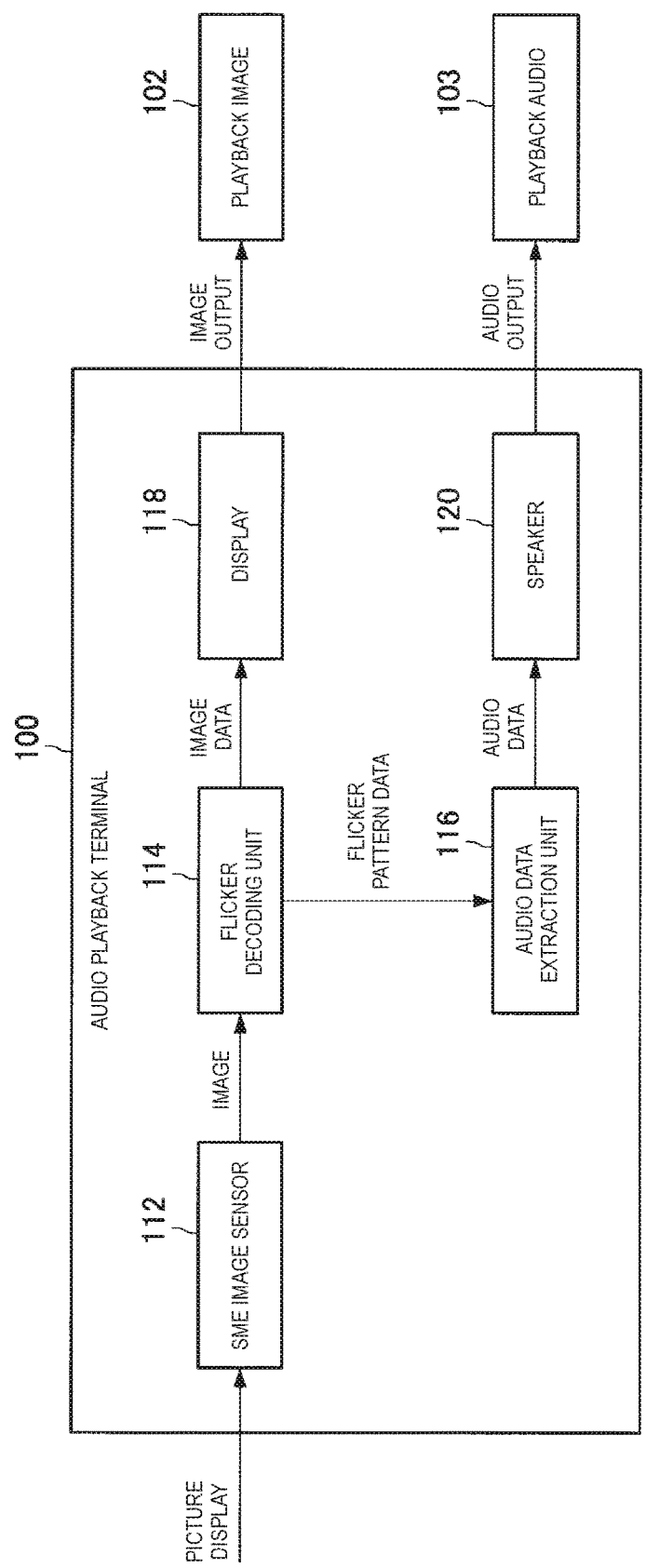
FIG. 9 is an explanatory diagram illustrating an exemplary functional configuration of an audio playback terminal 100.

FIG. 9 is an explanatory diagram illustrating an exemplary functional configuration of the audio playback terminal 100. Hereinafter, FIG. 9 will be used to describe an exemplary functional configuration of the audio playback terminal 100.

As illustrated in FIG. 9, the audio playback terminal 100 is configured to include an SME image sensor 112, a flicker decoding unit 114, an audio data extraction unit 116, a display 118, and a speaker 120.

The SME image sensor 112 captures a picture displayed on the visible light communication display 20. After capturing a picture displayed on the visible light communication display 20, the SME image sensor 112 supplies an image obtained by the capture to the flicker decoding unit 114.

The SME image sensor 112 drives in an operating mode enabling the visible light communication discussed earlier. In other words, the SME image sensor 112 is set to perform rolling shutter imaging in which are set two different exposure times, namely a long exposure and a short exposure. By having the SME image sensor 112 perform rolling shutter imaging in which are set two different exposure times, namely a long exposure and a short exposure, the audio playback terminal 100 is able to separate an arbitrary captured image into a flicker-less image and a flicker signal that acts as communication data.

The flicker decoding unit 114 separates the image received by the SME image sensor 112 into flicker-less image data and flicker pattern data that acts as the basis of an audio data signal. After separating the image received by the SME image sensor 112 into flicker-less image data and flicker pattern data that acts as the basis of an audio data signal, the flicker decoding unit 114 delivers the image data to the display 118, and delivers the flicker pattern data to the audio data extraction unit 116. The flicker decoding unit 114 uses the method discussed earlier as the method of separating flicker pattern data from an image.

The audio data extraction unit 116 extracts audio data from the flicker pattern data received from the flicker decoding unit 114. After extracting audio data from the flicker pattern data, the audio data extraction unit 116 delivers the extracted audio data to the speaker 120.

When extracting the audio data from the flicker pattern data, the audio data extraction unit 116 demodulates the data that has been modulated by phase shift keying discussed earlier, and thereby restores the transmission data. The pilot signal added by the visible light communication display 20 is used for synchronization with the phase shift keying modulation.

An example of the extraction of audio data by the audio data extraction unit 116 will be given. The audio data extraction unit 116 searches for a data start mark, which is header information added by the visible light communication display 20. After discovering the data start mark added by the visible light communication display 20, the audio data extraction unit 116 subsequently checks whether the data identification ID is an audio data ID.

If the data identification ID is checked and the transmission data is confirmed to be audio data, the audio data extraction unit 116 subsequently acquires the data size, and reads out an amount of data equal to the data size as audio data. After reading out an amount of data equal to the data size as audio data, the audio data extraction unit 116 subsequently checks for the presence of a data end mark, and by the presence of the data end mark, confirms whether or not the audio data has been read correctly.

The above thus illustrates an example of the extraction of audio data by the audio data extraction unit 116, but the extraction of audio data is not limited to such an example. The ways in which data is stipulated and the ways in which data is extracted on the basis of such stipulations may be determined arbitrarily in accordance with the design of the visible light communication system.

The display 118 is made up of a liquid crystal display, an organic EL display, or the like, for example, and displays a playback image 102 on the basis of image data received from the flicker decoding unit 114. The speaker 120 outputs playback audio 103 on the basis of audio data extracted by the audio data extraction unit 116.

The above thus describes an exemplary functional configuration of the audio playback terminal 100 using FIG. 9. The audio playback terminal 100, by having a configuration as illustrated in FIG. 9, is able to receive audio data from the visible light communication display 20 by visible light communication via the capture of an arbitrary picture displayed on the visible light communication display 20, and is also able to play back the received audio data.

Figure 10:
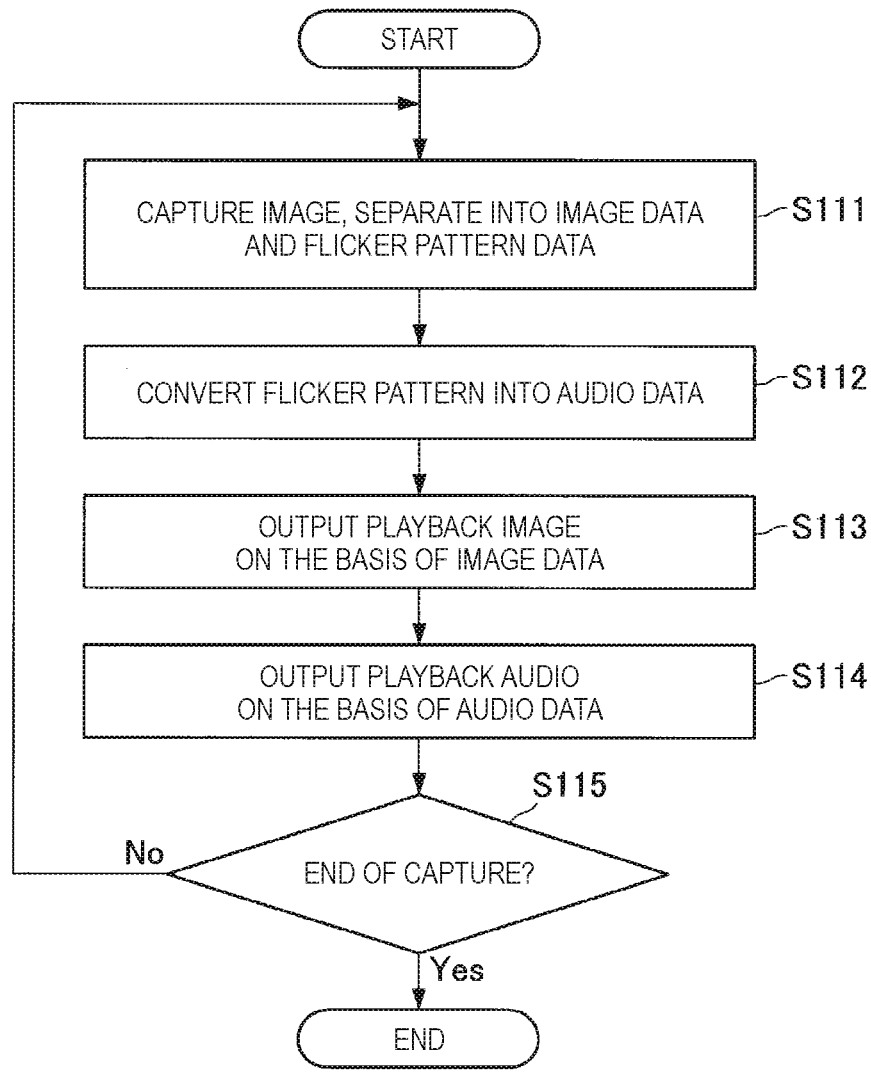
FIG. 10 is a flowchart illustrating example operations of an audio playback terminal 100.

Next, example operations of the audio playback terminal 100 will be described. FIG. 10 is a flowchart illustrating example operations of the audio playback terminal 100. FIG. 10 illustrates example operations of the audio playback terminal 100 when receiving audio data via the capture of an arbitrary image displayed on the visible light communication display 20, and playing back the audio. Hereinafter, FIG. 10 will be used to describe example operations of the audio playback terminal 100.

The audio playback terminal 100 captures an arbitrary image displayed on the visible light communication display 20 with the SME image sensor 112, and in the flicker decoding unit 114, separates the captured image into flicker-less image data and flicker pattern data that acts as the basis of an audio data signal (step S111).

After separating the captured image into flicker-less image data and flicker pattern data that acts as the basis of an audio data signal, next the audio playback terminal 100 converts the flicker pattern data into audio data and extracts the audio data in the audio data extraction unit 116 (step S112).

After converting the flicker pattern data into audio data and extracting the audio data, next the audio playback terminal 100 outputs a playback image 102 with the display 118 on the basis of the flicker-less image data (step S113), and also outputs playback audio 103 with the speaker 120 on the basis of the extracted audio data (step S114).

If the capture by the SME image sensor 112 has not ended (step S115, No), the audio playback terminal 100 returns to the capture and separation process in step S111, whereas if the capture by the SME image sensor 112 ends (step S115, Yes), the audio playback terminal 100 ends the processing sequence.

The above thus describes example operations of the audio playback terminal 100 using FIG. 10. The audio playback terminal 100, by executing operations as illustrated in FIG. 10, is able to receive audio data from the visible light communication display 20 by visible light communication via the capture of an arbitrary picture displayed on the visible light communication display 20, and is also able to play back the received audio data.

1.4. Modifications

The foregoing thus illustrates visible light communication of audio data by the visible light communication display 20 and the audio playback terminal 100. Next, a modification of visible light communication of audio data by the visible light communication display 20 and the audio playback terminal 100 will be given.

In a case in which a user points the SME image sensor 112 of the audio playback terminal 100 at the visible light communication display 20 to play back audio with the audio playback terminal 100, not a little processing latency is produced in the process of playing back the audio data communicated by visible light communication. As a result of the processing latency being produced, if the audio playback terminal 100 attempts to play back audio on the speaker 120 while displaying an image on the display 118, the audio is played back with a delay equal to the amount of processing latency, and the time lag with respect to the picture poses a problem.

In other words, it would be best for the audio playback terminal 100 to convert the flicker pattern data into audio data without lag, and be able to output the playback image 102 from the display 118 and output the playback audio 103 from the speaker 120 at the same timing. However, in the audio playback terminal 100, the conversion of data takes time, and the output of the playback image 102 from the display 118 and the output of the playback audio 103 from the speaker 120 are expected to have misaligned timings.

Accordingly, a modification will be described, the objective of which is to anticipate such misaligned timings, add information about the delay amount to the transmission data in the visible light communication display 20 in advance, and delay the output of an image in accordance with the delay amount, thereby making it possible to conduct the output of the playback image 102 from the display 118 and the output of the playback audio 103 from the speaker 120 at the same timing.

Figure 11:
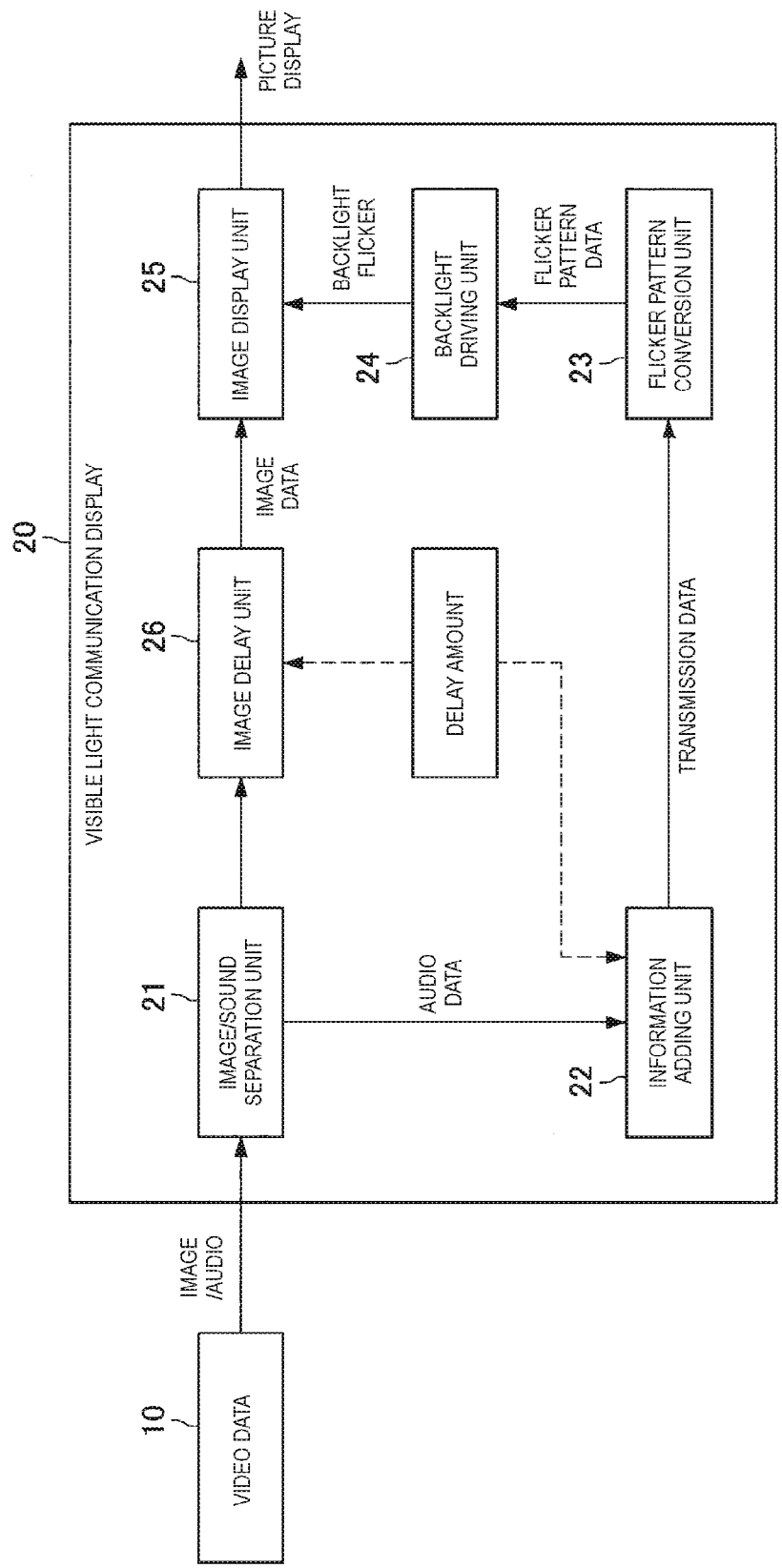
FIG. 11 is an explanatory diagram illustrating an example modification of a functional configuration of a visible light communication display 20.

FIG. 11 is an explanatory diagram illustrating an example modification of a functional configuration of the visible light communication display 20. In the visible light communication display 20 illustrated in FIG. 11, an image delay unit 26 has been added to the configuration of the visible light communication display 20 illustrated in FIG. 6.

The image delay unit 26 buffers and delays image data received from the image/sound separation unit 21 by a delay amount given as a parameter. After buffering and delaying the image data by the delay amount, the image delay unit 26 delivers the image data to the image display unit 25. In other words, the audio data that acts as the basis of the flicker pattern becomes data that is earlier than the image data by a certain amount of time.

The information adding unit 22 adds the delay amount in the picture data and the audio data inside the header information. When playing back the audio data, the audio playback terminal 100 reads out, from the received data, the information about the delay amount added to the header information, and buffers and plays back the audio data delayed by an amount of time equal to the delay amount minus the time of the processing latency of the audio playback terminal 100. For example, if the processing latency in the audio playback terminal 100 is 0.6 s, and the delay amount in the image delay unit 26 is 1 s, the audio playback terminal 100 delays the playback of the audio data by 0.4 s.

In this way, by adding information about a delay amount to the header information in the visible light communication display 20, and outputting playback audio after buffering audio data by an amount of time equal to the delay amount minus the time of the processing latency in the audio playback terminal 100, it becomes possible to realize the output of playback audio that is synchronized with a playback image being viewed by the user's own eyes.

In the foregoing description, the visible light communication display 20 is captured using an SME image sensor 112 that includes a spatially multiplexed exposure function having a mechanism that captures an image by changing the exposure time for each row or each pixel. Hereinafter, an example of expanding the amount of visible light communication by making the frame rate different between the long exposure and the short exposure will be described.

With the visible light communication method used in the present embodiment, the amount of data transferrable in one frame is proportional to the number of vertical lines of the visible light communication display 20 on the imaging face of the SME image sensor 112. When the visible light communication display 20 is captured so as to fill up the entire imaging face of the SME image sensor 112, the maximum transfer rate is obtained.

Figure 12:
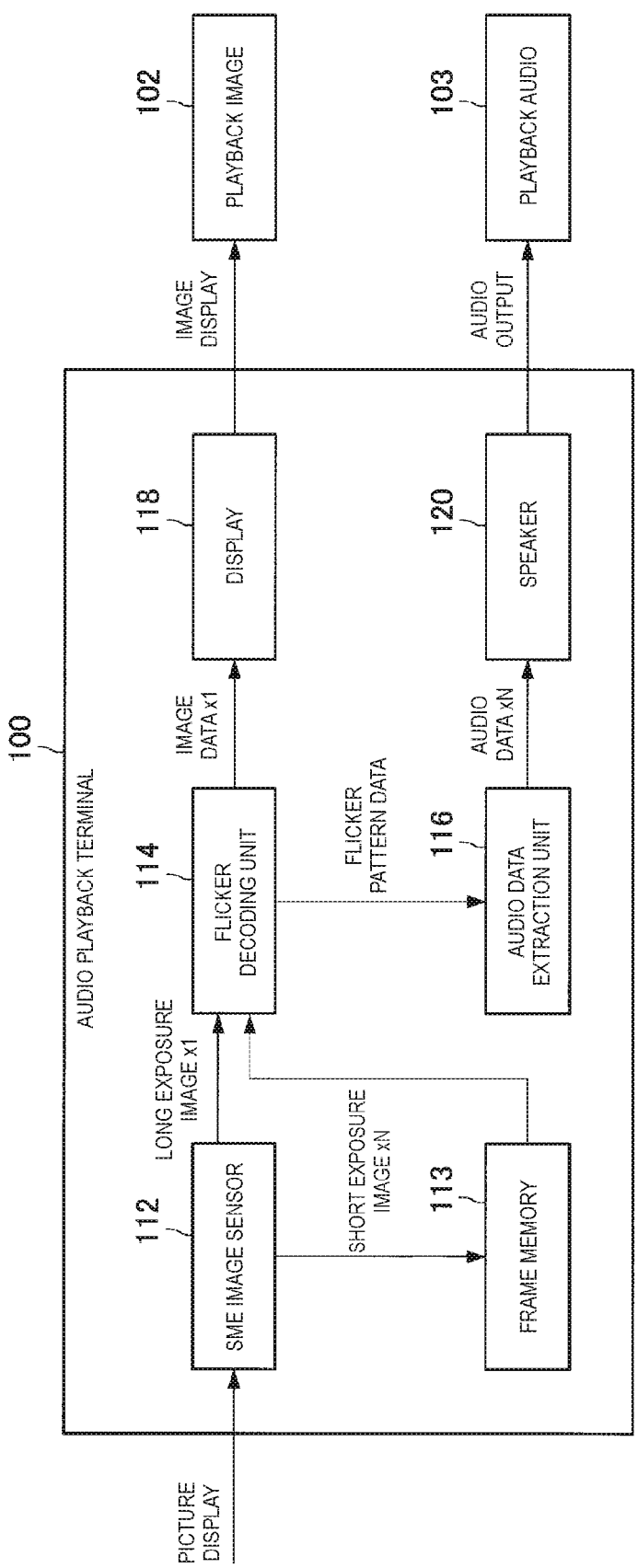
FIG. 12 is an explanatory diagram illustrating an example modification of a functional configuration of an audio playback terminal 100.

FIG. 12 is an explanatory diagram illustrating an example modification of a functional configuration of the audio playback terminal 100. In the audio playback terminal 100 illustrated in FIG. 12, frame memory 113 has been added to the configuration of the audio playback terminal 100 illustrated in FIG. 9.

With the visible light communication method used in the present embodiment, raising the transfer rate may be achieved by increasing the number of vertical lines captured by the rolling shutter, but may also be achieved by raising the frame rate. For example, if the long exposure side is assigned to picture viewing and the short exposure side is assigned to communication, raising the frame rate on the short exposure side makes it possible to increase the total amount of the number of vertical lines. With the visible light communication method used in the present embodiment, it is not necessary to complete the exposure together in pairs of an image on the long exposure side and an image on the short exposure side, and instead the extraction of a flicker pattern may be conducted even between the pair of a short exposure image captured during the exposure of a long exposure image, and a long exposure image whose exposure is completed later.

Figure 13:
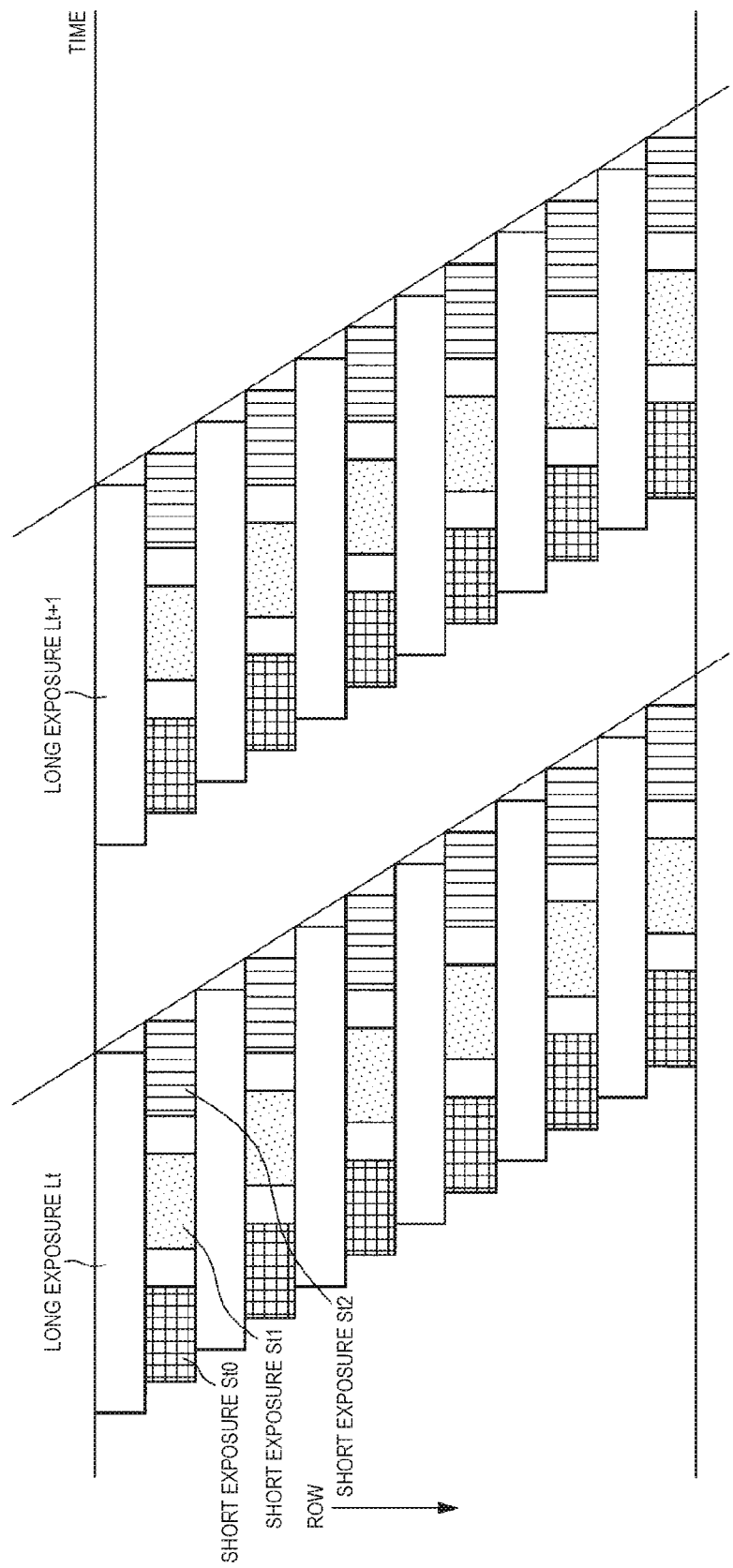
FIG. 13 is an explanatory diagram illustrating an example in a case of extracting a flicker pattern with a long exposure image and a short exposure image.

The frame memory 113 is memory that temporarily stores an image on the short exposure side. FIG. 13 is an explanatory diagram illustrating an example in a case of extracting a flicker pattern with a long exposure image and a short exposure image. FIG. 13 illustrates an example of the exposure times of long exposures $Lt$ and $Lt+1$, and of short exposures $St0$, $St1$, and $St2$ whose exposure times are shorter than the long exposures.

As illustrated in FIG. 13, the extraction of a flicker pattern is possible between the long exposure $Lt$ and the short exposure $St2$, and in addition, the extraction of a flicker pattern similarly is possible between the long exposure $Lt$ and the short exposure $St0/St1$.

The audio playback terminal 100 holds short exposure images in the frame memory 113 until the exposure of a long exposure image is completed, and after the exposure of the long exposure image is completed, the audio playback terminal 100 sequentially reads out the accumulated short exposure images from the frame memory 113 and sends the read-out short exposure images to the flicker decoding unit 114. The flicker decoding unit 114 takes a pair of a long exposure image and a short exposure image read out from the frame memory 113 as input, and separates image data and a flicker pattern.

In this way, by shortening the exposure time on the short exposure side to raise the frame rate, the substantially transferrable amount may be increased. On the other hand, the short exposure time may also result in an increase in the proportion of noise occupying the signal, and an increase in the number of pixels for AD conversion. To resolve these issues, analog pixel addition of nearby pixel values may be performed to decrease noise for AD conversion, or pixels may simply be sampled in the horizontal direction. With the visible light communication method used in the present embodiment, since a flicker pattern is extracted by using pixel values integrated in the horizontal direction, high-speed operation may be realized by increasing the number of pixels to add together or increasing the number of pixels to skip during sampling in the horizontal direction.

Next, a modification will be described in which playback audio is output in accordance with the orientation of the image captured by the SME image sensor 112.

Figure 14:
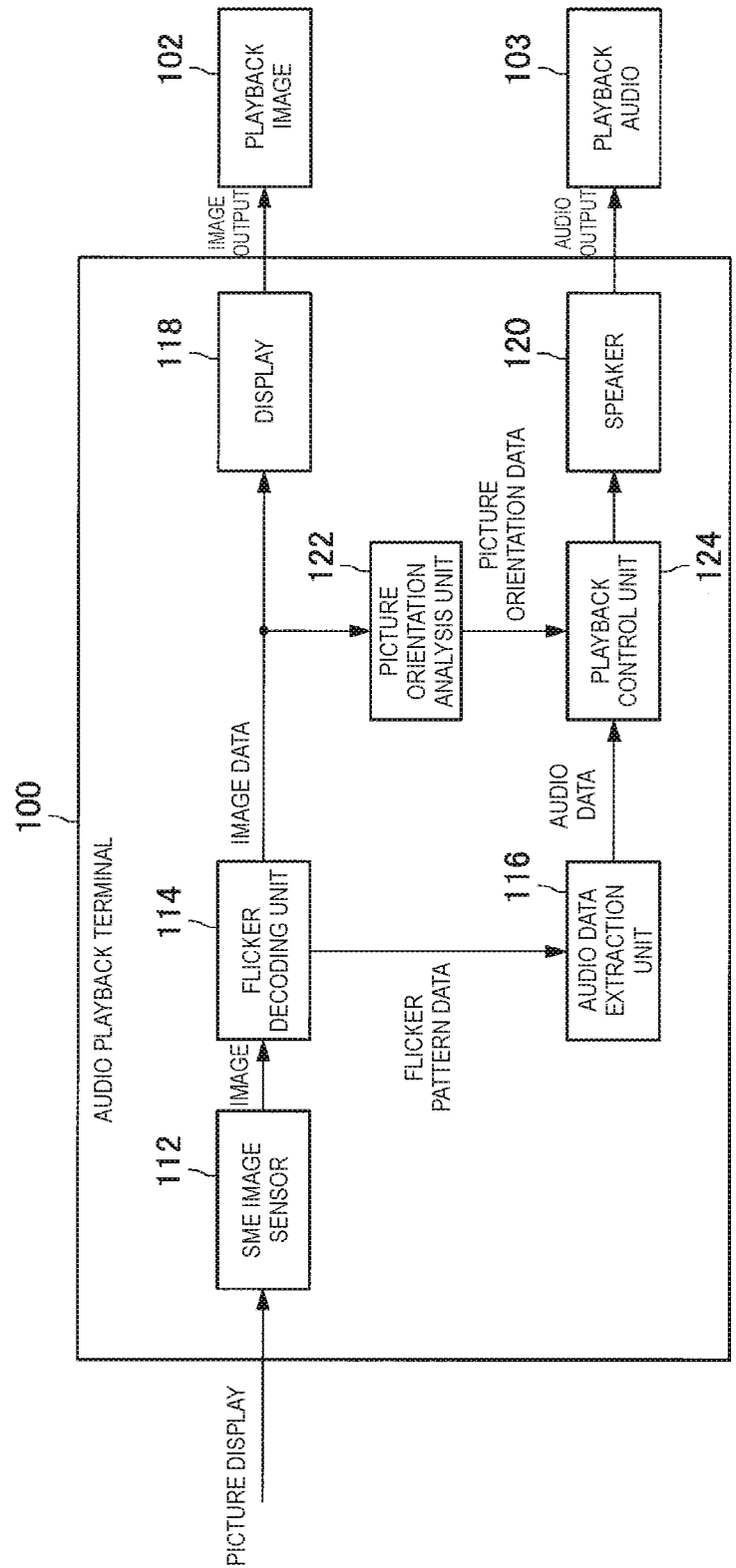
FIG. 14 is an explanatory diagram illustrating an example modification of a functional configuration of an audio playback terminal 100.

FIG. 14 is an explanatory diagram illustrating an example modification of a functional configuration of the audio playback terminal 100. In the audio playback terminal 100 illustrated in FIG. 12, a picture orientation analysis unit 122 and a playback control unit 124 have been added to the configuration of the audio playback terminal 100 illustrated in FIG. 9.

Playing back audio with the visible light communication method used in the present embodiment has an advantage in that the image to display on the visible light communication display 20 may be arbitrary. By making the image to display on the visible light communication display 20 be arbitrary, the user of the audio playback terminal 100 is able to enjoy images and audio at the same time.

When outputting playback audio on the audio playback terminal 100, by varying the volume and localization of the playback in accordance with the appearance of the visible light communication display 20 from the audio playback terminal 100, it is possible to further interactivity and entertainment further.

Specifically, control such as raising the volume of the playback audio as the user approaches the visible light communication display 20 while pointing the audio playback terminal 100 at the visible light communication display 20, or changing the localization of the playback audio in accordance with the orientation (such as the position, size, and angle) of the visible light communication display 20 in the captured image, may be realized with the audio playback terminal 100 illustrated in FIG. 14.

The picture orientation analysis unit 122 receives image data from the flicker decoding unit 114, and computes information related to the orientation (such as the position, size, and angle) of the visible light communication display 20 in the image. The picture orientation analysis unit 122 delivers picture orientation data, which is information related to the orientation (such as the position, size, and angle) of the visible light communication display 20 in the image, to the playback control unit 124.

The playback control unit 124 controls the playback of audio data extracted by the audio data extraction unit 116, in accordance with the picture orientation data received from the picture orientation analysis unit 122. The picture orientation data may include, for example, data expressing at what position, how large, and at what tilt the visible light communication display 20 appears in the captured image, the data being a rectangle enclosing the display, or in other words, the upper-left two-dimensional coordinate value and the size of the rectangle in the captured image.

Figure 15:
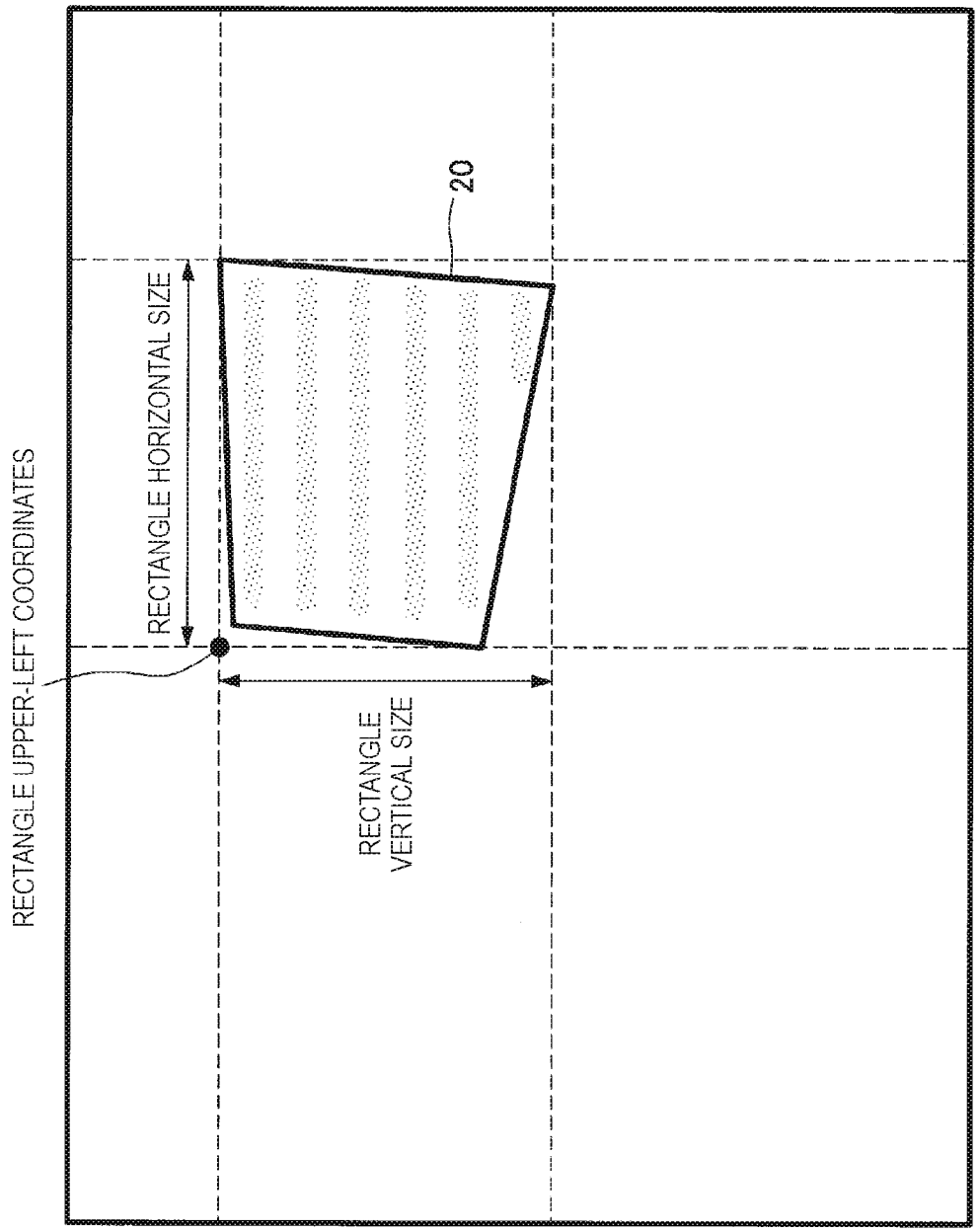
FIG. 15 is an explanatory diagram illustrating an example of an image captured by an SME image sensor 112.

FIG. 15 is an explanatory diagram illustrating an example of an image captured by the SME image sensor 112. As illustrated in FIG. 15, when the visible light communication display 20 is depicted in an image captured by the SME image sensor 112, information about the two-dimensional coordinate value at the upper-left of the rectangle and the size of the rectangle is included in the picture orientation data.

The rectangular region of the visible light communication display 20 may be computed by first computing the image difference values of (pre-flicker removal image)−(post-flicker removal image), marking the pixels having a difference equal to or greater than a certain threshold value, and calculating a rectangle containing the marks. For the (pre-flicker removal image), either one of the long exposure image and the short exposure image may be used, or an integration of the differences between the long exposure image and the short exposure image may be used.

The playback control unit 124 modifies the audio volume on the basis of the picture orientation data. For example, the playback control unit 124 applies gain to a certain volume size in accordance with the surface area of the rectangle depicting the visible light communication display 20. The playback control unit 124 may also decide the playback volume gain like in the following formula, for example.

$$\text{Playback volume gain}=0.5+0.5\times \text{rectangle surface area}/\text{screen surface area}$$

According to this formula, the playback control unit 124 is able to vary the playback volume gain value from 0.5 to 1.0 in accordance with the rectangle surface area.

The playback control unit 124 similarly is able to associate the localization of audio with the picture orientation data. For example, to vary the left/right localization, the playback control unit 124 varies the playback localization position over a range from 0.0 to 1.0. Note that 0.0 is taken to be left, 1.0 is right, and 0.5 is center.

$$\text{Playback localization position}=0.5+((\text{rectangle upper-left coordinate X-value}+\text{rectangle horizontal size}/2)-\text{captured image horizontal size}/2)/\text{captured image horizontal size}$$

According to this formula, the playback control unit 124 is able to vary the localization position of the playback audio from 0.0 to 1.0 in accordance with the position where the rectangle appears.

Note that in the present modification, the picture orientation data is computed by calculation performed by the picture orientation analysis unit 122, but the present disclosure is not limited to such an example. For example, a graphical user interface (GUI) may be displayed on the display 118 of the audio playback terminal 100, and the GUI may enable the user to specify the region of the visible light communication display 20.

For example, an image captured by the SME image sensor 112 may be presented on the display 118 of the audio playback terminal 100, and the GUI may enable the user to specify the region of the visible light communication display 20 with a rectangle. Additionally, the audio playback terminal 100 may also prompt the user to perform an operation so that the visible light communication display 20 appears inside a rectangular region previously specified by the user using the GUI. In this case, the audio playback terminal 100 may overlay a rectangular frame onto an image captured by the SME image sensor 112 on the display 118 of the audio playback terminal 100, and prompt the user to perform an operation so that the visible light communication display 20 goes inside the rectangular frame.

The above thus illustrates a modification that controls audio playback by analysis of the orientation of the visible light communication display 20. Next, a modification will be described in which the transfer rate is increased by analysis of the orientation of the visible light communication display 20.

Figure 16:
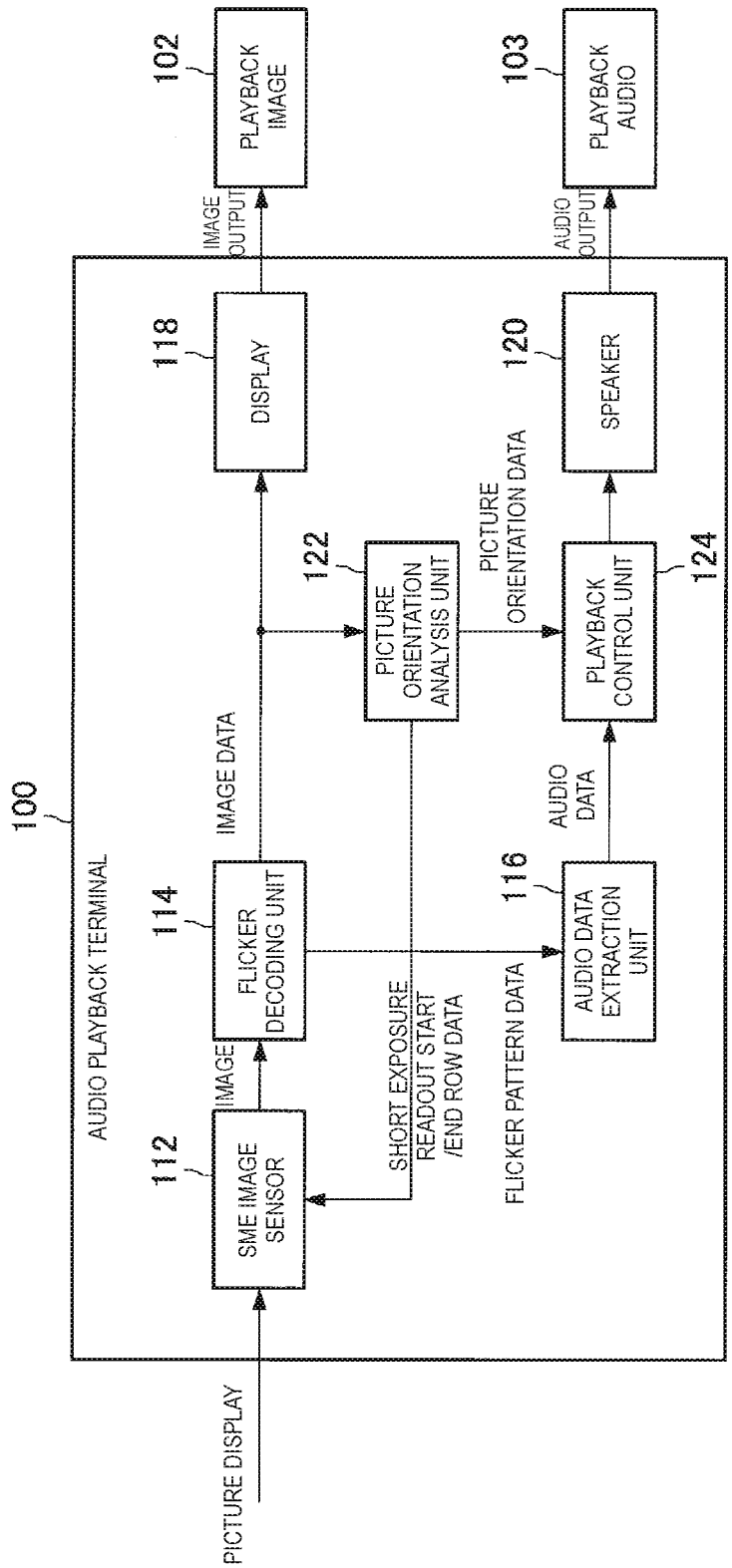
FIG. 16 is an explanatory diagram illustrating an example modification of a functional configuration of an audio playback terminal 100.

FIG. 16 is an explanatory diagram illustrating an example modification of a functional configuration of the audio playback terminal 100. In the audio playback terminal 100 illustrated in FIG. 16, a picture orientation analysis unit 122 and a playback control unit 124 have been added to the configuration of the audio playback terminal 100 illustrated in FIG. 9.

In the transfer of audio data by the visible light communication method used in the present embodiment, the amount of transferrable information changes in accordance with the apparent size at which the visible light communication display 20 occupies the field of view of the SME image sensor 112. This is because audio data is communicated by the difference in the flicker components of two exposures, namely a long exposure and a short exposure, and the transfer rate reaches a maximum when the visible light communication display 20 is depicted filling up the entire field of view of the SME image sensor 112. On the other hand, when the visible light communication display 20 is depicted in a portion of the field of view of the SME image sensor 112, audio data cannot be received from the rows not depicting the visible light communication display 20.

When the visible light communication display 20 is depicted in a portion of the field of view of the SME image sensor 112, the audio playback terminal 100 is able to read out just the rows on which audio data is receivable by identifying the rows that depict the visible light communication display 20 (designated the valid visible light communication rows). Furthermore, the audio playback terminal 100 is able to increase the transfer rate of an audio signal by re-reading the valid visible light communication rows again during the time in which the rows other than the valid visible light communication row would have been read.

For example, if the audio playback terminal 100 were to read out the valid visible light communication rows N times during the time in which the rows other than the valid visible light communication rows would have been read, an audio signal multiplied by N may be read out. In other words, when valid visible light communication rows are detected over the entire screen, the audio playback terminal 100 reads out the entire screen once, whereas when the valid visible light communication rows are a portion of the screen, the audio playback terminal 100 reads out all or some of the valid rows multiple times, thereby making it possible to keep the overall transfer rate of audio data constant, even if the visible light communication display 20 is depicted at small size.

In the audio playback terminal 100 illustrated in FIG. 16, the picture orientation analysis unit 122 identifies the row positions where flicker appears in the rectangular region of the visible light communication display 20. Take FSTART_Y to be the first row where flicker appears, and FEND_Y to be the last row. Next, the picture orientation analysis unit 122 decides the short exposure readout start and end rows from the positions of the rows where flicker appears. Take READSTART_Y to be the short exposure readout start row, and READEND_Y to be the short exposure readout end row. However, the readout start row is set to be contained between FSTART_Y and FEND_Y. The picture orientation analysis unit 122 sends the values of READSTART_Y and READEND_Y to the SME image sensor 112.

The SME image sensor 112 repeats the readout of the short exposure, from READSTART_Y to READ_ENDY sent from the picture orientation analysis unit 122, a number of times equal to the number of long exposure rows. In other words, the total number of long exposure readout rows and short exposure readout rows by the SME image sensor 112 is the same.

Figure 17:
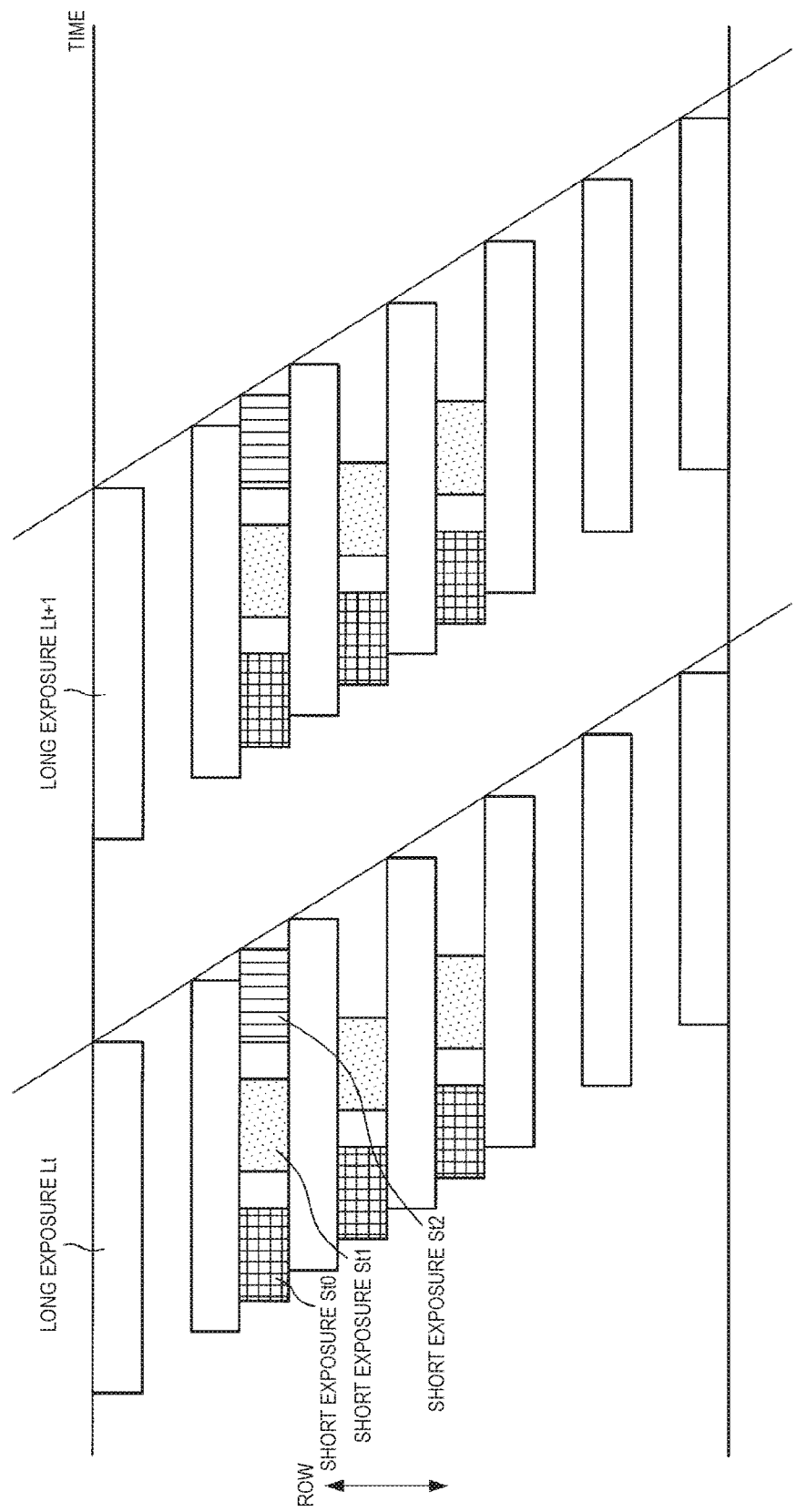
FIG. 17 is an explanatory diagram illustrating an example of a readout process.
Figure 18:
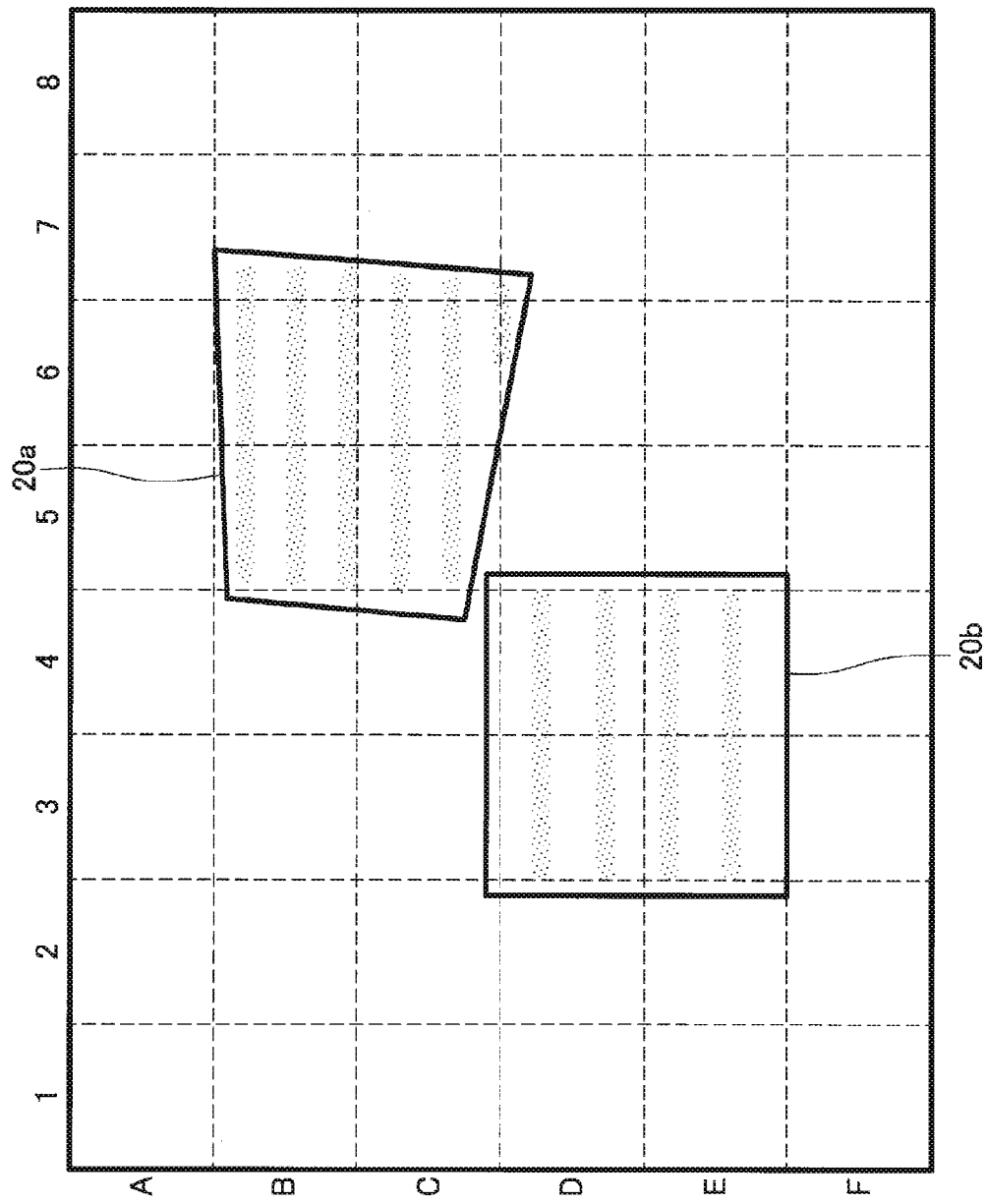
FIG. 18 is an explanatory diagram illustrating an example of extracting a flicker pattern.

FIG. 17 is an explanatory diagram illustrating an example of a readout process when the visible light communication display 20 is depicted in a portion of the field of view of the SME image sensor 112. FIG. 17 schematically illustrates an example of a case in which the number of valid visible light communication rows, or in other words the number of rows to read out by the short exposure, is three rows. By conducting the readout by the short exposure from READSTART_Y to READ_ENDY sent from the picture orientation analysis unit 122, the overall transfer rate of audio data is kept constant, even if the visible light communication display 20 is depicted at small size.

A modification will be described for a case in which multiple visible light communication displays 20 are depicted in an image captured by the SME image sensor 112. For example, in a location such as a movie viewing corner of a store, if content pictures are playing on multiple visible light communication displays 20, and the user wants to point the audio playback terminal 100 at a visible light communication display 20 to play back a display, it is conceivable that multiple visible light communication displays 20 may be included in the captured image. In this case, if the depictions included in the captured image are treated as a single visible light communication display 20 and special processing is not conducted by the audio playback terminal 100, multiple sets of flicker pattern data may become concatenated or mixed.

In such cases in which multiple sets of data are transmitted at the same time, with typical wireless communication methods, the cross talk of information is prevented by a technique such as using different wavelength bands for the carrier waves. In the case of transmitting audio data by the visible light communication method used in the present embodiment, communication is also possible while assigning a carrier wave wavelength to each visible light communication display during modulation, but by utilizing the fact that the SME image sensor 112 obtains two-dimensional information, the inconvenience of such carrier wave wavelength assignment may be omitted.

In the case in which multiple visible light communication displays 20 are depicted in an image captured by the SME image sensor 112, visible light communication may be realized similarly with the configuration of the audio playback terminal 100 illustrated in FIG. 14.

The flicker decoding unit 114 determines whether or not multiple visible light communication displays 20 are included in an image captured by the SME image sensor 112. If a visible light communication display 20 is not included at all, the flicker decoding unit 114 does not decode flicker pattern data. If just one visible light communication display 20 is included, the flicker decoding unit 114 decodes and delivers flicker pattern data to the audio data extraction unit 116. Additionally, if multiple visible light communication displays 20 are included, the flicker decoding unit 114 decodes and delivers the respective flicker pattern data to the audio data extraction unit 116.

If multiple visible light communication displays 20 are included in an image captured by the SME image sensor 112, the flicker decoding unit 114 spatially partitions the image into segments, and extracts flicker pattern data from each segment. The determination of whether or not multiple visible light communication displays are included inside the captured screen is conducted as follows.

FIGS. 18 to 21 are explanatory diagrams illustrating an example of extracting a flicker pattern in a case in which two visible light communication displays 20 are included in an image captured by the SME image sensor 112. The flicker decoding unit 114 first divides the captured image into a certain block size. In the example illustrated in FIG. 18, the image captured by the SME image sensor 112 is taken to be divided into blocks 1 to 8 in the horizontal direction, and blocks A to F in the vertical direction.

Figure 19:
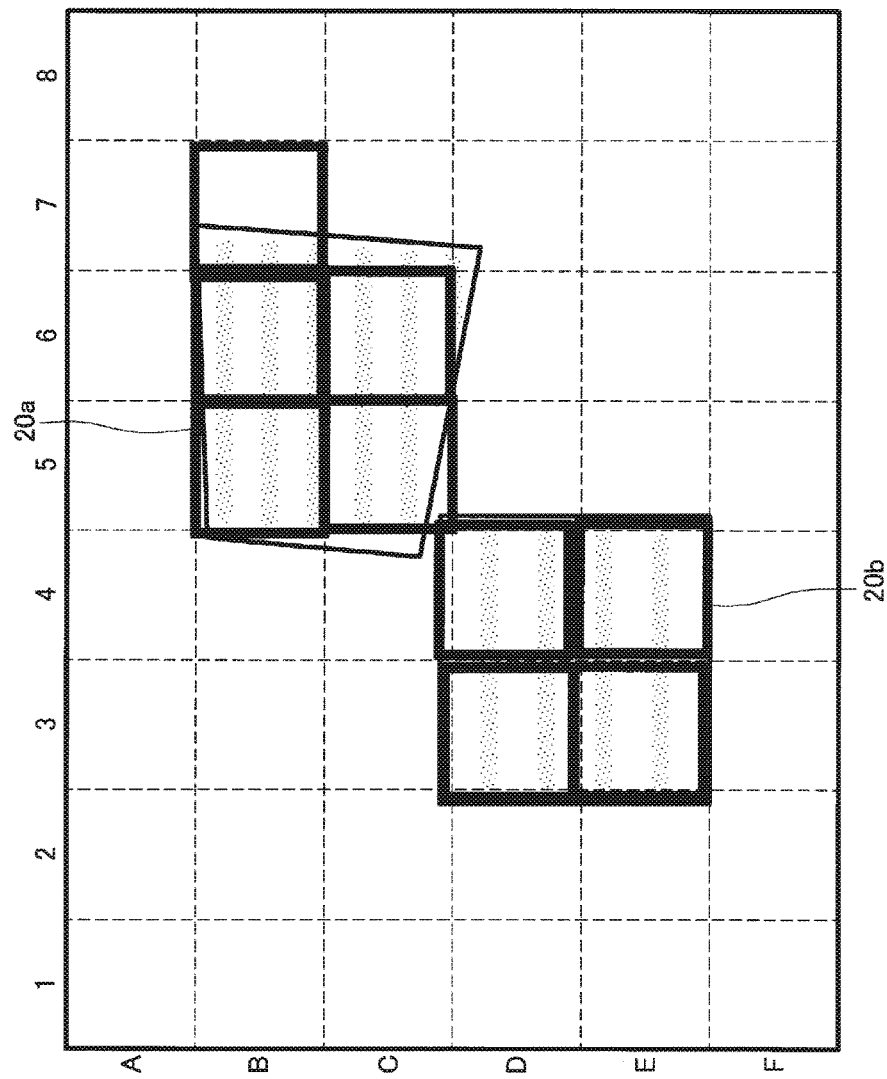
FIG. 19 is an explanatory diagram illustrating an example of extracting a flicker pattern.

Next, as illustrated in FIG. 19, the flicker decoding unit 114 determines whether or not a flicker pattern is detectable in each block. The flicker decoding unit 114 conducts the extraction of flicker pattern data from each block not over the entire image, but for each block individually. In the example illustrated in FIG. 19, the blocks 5B, 6B, 7B, 5C, 6C, 3D, 4D, 3E, and 4E are blocks in which a flicker pattern is determined to exist by the flicker decoding unit 114.

Next, as illustrated in FIG. 20, the flicker decoding unit 114 concatenates marked blocks in the horizontal direction. At this point, the flicker decoding unit 114 calculates the similarity of the flicker patterns detected between adjacent blocks, and concatenates the blocks if determined to be sufficiently similar. Herein, an example is illustrated in which the blocks are concatenated into the four groups of (5B, 6B, 7B), (5C, 6C), (3D, 4D), and (3E, 4E) by the flicker decoding unit 114. In addition, the flicker decoding unit 114 checks whether or not the frame start information of a pilot signal is included in the concatenated blocks. Herein, the frame start information of a pilot signal exists in (5B, 6B, 7B) and (3D, 4D), and is assigned the symbol H.

Next, as illustrated in FIG. 21, the flicker decoding unit 114 takes a block including the frame start information from among the concatenated blocks as a starting point, and expands the concatenated blocks downward. If other concatenated blocks exist directly below the concatenated blocks, the flicker decoding unit 114 concatenates these blocks, but if a concatenated block is the concatenated block of a starting point that includes frame start information, the flicker decoding unit 114 does not conduct the concatenation. In FIG. 21, an example is illustrated in which the two concatenated blocks of F0 and F1 are obtained.

If multiple visible light communication displays 20 are included in the game, the flicker decoding unit 114 decides the presence regions of the multiple visible light communication displays 20 in units of blocks in this way. The multiple concatenated blocks are decoded for each concatenated block individually and sequentially sent to the audio data extraction unit 116.

The picture orientation analysis unit 122 determines whether or not multiple visible light communication displays 20 are included in an image captured by the SME image sensor 112, and if multiple visible light communication displays 20 are included, analyzes the picture orientation of each visible light communication display 20, and transmits to the playback control unit 124 picture orientation data equal to the number of visible light communication displays 20.

The picture orientation analysis unit 122 uses the concatenated block information computed by the flicker decoding unit 114 to send picture orientation data to the playback control unit 124. For example, the picture orientation analysis unit 122 selects the concatenated block having the largest surface area, and treats rectangle information containing the concatenated block as picture orientation data. As another example, the picture orientation analysis unit 122 selects the concatenated block whose center-of-gravity two-dimensional coordinate position is closest to the center of the captured image, and treats rectangle information containing the concatenated block as picture orientation data.

When multiple sets of picture orientation data are sent from the picture orientation analysis unit 122, the playback control unit 124 controls the playback of audio data based on the multiple sets of picture orientation data. The playback control unit 124 selects the audio data associated with the picture orientation data sent from the picture orientation analysis unit 122 from among the multiple sets of received audio data, and delivers the selected audio data to the speaker 120. By selecting the audio data associated with the picture orientation data sent from the picture orientation analysis unit 122 for delivery to the speaker 120, the user is able to simply point the audio playback terminal 100 at the visible light communication display 20 from which the user wants to receive audio data, and thereby intuitively playback the audio associated with the audio data having the largest display surface area or the display positioned in the center of the captured image.

The audio playback terminal 100 may select and play back just one set of audio data, or play back all sets of received audio data. When playing back all sets of audio data, the audio playback terminal 100 may also adjust the volume of each set of audio data in accordance with the surface area of the concatenated blocks. Also, when playing back all sets of received audio data, the audio playback terminal 100 may vary the localization of the playback audio in accordance with the center-of-gravity position of the concatenated blocks in the captured image.

In the working example discussed above, the audio playback terminal 100 identifies the position of the visible light communication display 20 automatically from the region where flicker occurs, but the present disclosure is not limited to such an example. For example, the audio playback terminal 100 may also enable the user to use a GUI to select the position of the visible light communication display 20.

For example, in a case in which multiple visible light communication displays 20 are detected, the audio playback terminal 100 may display the detection result on the display 118 in a format such as detection rectangles enclosing the visible light communication displays, and display on the display 118 a GUI enabling the user to select one of the rectangles. If the display 118 is provided with a touch panel, the audio playback terminal 100 may also enable to the user to select one of the multiple detection rectangles with a user operation on the touch panel. As another example, the audio playback terminal 100 may enable the user to specify the position of valid visible light communication rows in a state of displaying on the display 118 an image capturing a visible light communication display.

Also, in the working example discussed above, the audio playback terminal 100 judges the picture orientation analysis that identifies the position of the visible light communication display 20 by the presence or absence of flicker in individual blocks, but the present disclosure is not limited to such an example. For example, the audio playback terminal 100 may also analyze the orientation of the visible light communication display by a method using image recognition.

For example, a marker may be included at a certain position in the picture presented by the visible light communication display 20, such as in the four corners of the picture, for example, with the marker being identifiable by an image recognition process in the audio playback terminal 100. The marker may be of any kind, and may be a grid or lattice, for example.

Subsequently, when analyzing the picture orientation of the visible light communication display 20, the audio playback terminal 100 first detects the marker included in the picture, and identifies certain positions (the four corner points, for example. If the marker is successfully detected, the audio playback terminal 100, working under the assumption that the visible light communication display 20 is a rectangular plane, applies a rectangular shape converted by perspective projection to calculate the orientation of the visible light communication display 20.

By conducting picture orientation analysis of the visible light communication display 20 using such a marker, it is no longer necessary to limit the shape of the visible light communication display 20 to a rectangle. Also, the audio playback terminal 100 is able to detect an arrangement of markers together with the shape of the visible light communication display 20.

The audio playback terminal 100 may also be configured to control the output of the playback audio 103 in accordance with the content of the picture presented by the visible light communication display 20. For example, if the audio playback terminal 100 recognizes that certain text or a certain image is being displayed in the picture presented by the visible light communication display 20, the audio playback terminal 100 may be configured to control the output of the playback audio 103 in accordance with the content of the text or image.

For example, consider a case in which a mark encouraging the playback of audio is displayed on the visible light communication display 20, and the visible light communication display 20 presenting the mark is being displayed on the display 118 as an image captured by the audio playback terminal 100. If the user touches the mark displayed on the display 118, the audio playback terminal 100 may output playback audio 103 based on audio data received by visible light communication from the visible light communication display 20.

The audio playback terminal 100 may also be configured to save audio data received by visible light communication from the visible light communication display 20 to an internal recording medium such as RAM. By saving audio data received by visible light communication from the visible light communication display 20 to an internal recording medium such as RAM, the audio playback terminal 100 is able to output playback audio 103 based on the received audio data at an arbitrary timing.

The audio data received by visible light communication from the visible light communication display 20 may also include information about a timing at which to output the audio with the audio playback terminal 100. For example, information for outputting audio with the audio playback terminal 100, such as when a specific time is reached, when the audio playback terminal 100 is positioned in a specific location, or when the user performs a specific operation on the audio playback terminal 100, may also be transmitted by visible light communication from the visible light communication display 20.

1.5. Example Use Cases

Finally, example use cases of the visible light communication system described in the foregoing embodiments will be described.

The foregoing visible light communication system is applicable to a case in which the visible light communication display 20 is installed on a street corner, for example, and audio related to an advertisement picture being displayed on the visible light communication display 20 is to be played back from the audio playback terminal 100. If the user captures the advertising picture being displayed on the visible light communication display 20 with the audio playback terminal 100, the audio playback terminal 100 is able to play back audio related to the advertising picture. By playing back audio related to an advertising picture being displayed on the visible light communication display 20 from the audio playback terminal 100 in this way, it becomes possible for the user to listen to audio related to the advertising picture more easily, even in an noisy location such as a street corner.

In the modification discussed earlier, information about a delay amount accounting for the processing latency in the audio playback terminal 100 is transmitted from the visible light communication display 20 to the audio playback terminal 100. By transmitting information about a delay amount by visible light communication, audio synchronized with the advertising picture being displayed on the visible light communication display 20 may be played back from the audio playback terminal 100.

Multiple sets of audio data may be transmitted from the visible light communication display 20 to the audio playback terminal 100 by visible light communication. By transmitting multiple sets of audio data from the visible light communication display 20 to the audio playback terminal 100 by visible light communication, and in the audio playback terminal 100, selecting one set of audio data in accordance with attributes such as the user's gender, age, residence, and occupation, or an application that the user is using, for example, audio related to the advertising picture and specialized for the user may be played back from the audio playback terminal 100.

Visible light communication is able to transmit information from the visible light communication display 20 to multiple audio playback terminals 100, without being affected by band constraints or interference. Consequently, even when multiple users use audio playback terminals 100 to capture one visible light communication display 20 at the same time, a delay in the transmission of data is not produced, and interference effects are also not produced. Also, by conducting the playback of audio related to an advertising picture and specialized for the user discussed above, even when many users use audio playback terminals 100 to capture one visible light communication display 20 at the same time, audio related to the advertising picture and specialized for the user may be played back from each of the audio playback terminals 100.

In a case in which multiple visible light communication displays 20 are installed in a nearby location, such as on a street corner or in a store, the user may point the audio playback terminal 100 successively at the visible light communication displays 20, thereby enabling the audio playback terminal 100 to receive audio data from each of the visible light communication displays 20 by visible light communication, and play back audio successively. Also, by using the output control of audio in accordance with the orientation of the visible light communication display 20 in the captured image as discussed earlier, the user is able to perform actions such as moving the audio playback terminal 100 closer to the visible light communication display 20 when the user wants to listen at a high volume, and moving the audio playback terminal 100 away from the visible light communication display 20 when the user wants to listen at a low volume.

When transmitting audio data related to an advertising picture from the visible light communication display 20 to the audio playback terminal 100, information accompanying the audio data may also be transmitted. Such information accompanying the audio data may include information such as an identification ID that identifies the visible light communication display 20, and a time ID that identifies what time the advertising picture is delivered.

By transmitting such information to the audio playback terminal 100, it becomes possible to give the audio playback terminal 100 information about what advertising displayed at what timing on which visible light communication display 20 has been captured by the user. Additionally, the business delivering the advertising may collect this information from the audio playback terminal 100, and thereby become able to learn what advertising delivered at what timing on which visible light communication display 20 has been captured by how many users and what audio has been output.

A variety of use cases other than the use cases discussed above are conceivable. For example, in a location such as an art gallery or museum, the visible light communication display 20 may be installed near an exhibit, and the user may capture the visible light communication display 20 with the audio playback terminal 100 to thereby cause an explanation of the exhibit to be output from the audio playback terminal 100.

As another example, in a location such as a movie theater, the visible light communication display 20 may be installed near a poster of a movie currently showing, and the user may capture the visible light communication display 20 with the audio playback terminal 100 to thereby cause a description of the movie to be output from the audio playback terminal 100.

As another example, the visible light communication display 20 may be installed inside a building, and by having the user capture the visible light communication display 20 with the audio playback terminal 100 to cause audio to be output from the audio playback terminal 100, user navigation may be conducted.

As another example, in a location such as a server room, the visible light communication display 20 may be installed near server equipment, and by having the user capture the visible light communication display 20 with the audio playback terminal 100, the status of the server, such as whether or not an error has occurred, may be output from the audio playback terminal 100.

In addition, the visible light communication display 20 may be provided on electric equipment installed inside the home, and when the user points the audio playback terminal 100 at the visible light communication display 20, information related to the electric equipment may be output as audio from the audio playback terminal 100.

For example, the visible light communication display 20 may be provided on a telephone, and when the user points the audio playback terminal 100 at the visible light communication display 20 on the telephone, information such as the presence or absence of incoming calls, the presence or absence of answering machine messages, and answering machines messages may be output as audio from the audio playback terminal 100. As another example, the visible light communication display 20 may be provided on an air conditioner, and when the user points the audio playback terminal 100 at the visible light communication display 20 on the air conditioner, information such as a message related to the current settings may be output as audio from the audio playback terminal 100.

As another example, information about the address of a website on the Internet may be included in the audio data transmitted from the visible light communication display 20, and in addition to the playback of audio on the audio playback terminal 100, the relevant website may be accessed by a web browser of the audio playback terminal 100.

Obviously, the use cases discussed above are merely examples, and the transmission of audio data using visible light communication by the visible light communication display 20 and the audio playback terminal 100 may be utilized in other ways than the use cases discussed above.

2. CONCLUSION

According to an embodiment of the present disclosure as described above, there is provided a visible light communication system that transmits audio data from the visible light communication display 20 to the audio playback terminal 100 by visible light communication.

The visible light communication display 20 converts audio data into a flicker pattern, and displays an arbitrary image while causing the backlight to flicker on the basis of the flicker pattern. The audio playback terminal 100, after capturing the visible light communication display 20 displaying an arbitrary image while causing the backlight to flicker on the basis of the flicker pattern, extracts the flicker pattern from the captured image, converts the flicker pattern into audio data, and outputs audio on the basis of the audio data.

The visible light communication display 20 according to an embodiment of the present disclosure is not limited to a specific image, and is able to transmit audio data by visible light communication for any kind of image by displaying the image while causing the backlight to flicker on the basis of a flicker pattern converted from the audio data. Also, the audio playback terminal 100 according to an embodiment of the present disclosure, by simply capturing the visible light communication display 20 that is displaying an arbitrary image while causing the backlight to flicker on the basis of a flicker pattern, is able to receive audio data from the visible light communication display 20 by visible light communication and output audio based on the audio data, without requiring procedures such as a special pairing process.

When capturing the visible light communication display 20 that is displaying an arbitrary image while causing the backlight to flicker on the basis of a flicker pattern, the audio playback terminal 100 according to an embodiment of the present disclosure is able to analyze the orientation of the visible light communication display 20 and output audio in accordance with the orientation.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Additionally, it is possible to create a computer program for causing hardware such as a CPU, ROM, and RAM built into each device to exhibit functions similar to the configuration of each device discussed earlier. It is also possible to provide a storage medium having such a computer program stored therein. Additionally, by constructing the respective function blocks illustrated in the function block diagrams with hardware or hardware circuits, the series of processes may also be realized by hardware or hardware circuits. Additionally, some or all of the respective function blocks illustrated in the function block diagrams used in the foregoing description may also be realized by a server device connected over a network such as the Internet, for example. Also, the configuration of the respective function blocks illustrated in the function block diagrams used in the foregoing description may be realized by a lone device, or by a system in which multiple devices cooperate with each other. A system in which multiple devices cooperate with each other may include a combination of multiple server devices, a combination of a server device and a terminal device, or the like, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An image processing device, including:

a separation unit that separates a flicker pattern from an image obtained by capturing, at multiple exposure times, an image containing a scene that emits light on a basis of a flicker pattern converted from an audio signal; and a conversion unit that converts the separated flicker pattern to an original audio signal.

(2)

The image processing device according to (1), wherein the audio signal that acts as a basis for the flicker pattern is a signal that is earlier than the image by a certain amount of time.

(3)

The image processing device according to (1) or (2), wherein the separation unit separates the flicker pattern from an image captured at a second exposure time that is shorter than a first exposure time.

(4)

The image processing device according to any one of (1) to (3), further including:

an imaging unit that captures the image containing the scene over at least two exposure times of a first exposure time, and a second exposure time that is shorter than the first exposure time.

(5)

The image processing device according to (4), wherein the imaging unit conducts the capture over the second exposure time at a higher frame rate than the capture over the first exposure time.

(6)

The image processing device according to (5), wherein the imaging unit conducts the capture over the second exposure time at a higher frame rate than the capture over the first exposure time by sampling pixels in a horizontal direction when conducting the capture over the second exposure time.

(7)

The image processing device according to (5), wherein the imaging unit conducts the capture over the second exposure time at a higher frame rate than the capture over the first exposure time by conducting pixel addition in a horizontal direction when conducting the capture over the second exposure time.

(8)

The image processing device according to any one of (5) to (7), wherein the imaging unit conducts the capture over the second exposure time at a higher frame rate than the capture over the first exposure time only in a range of pixels containing the scene occupying a field of view of a captured image.

(9)

The image processing device according to any one of (1) to (8), further including:

a playback control unit that controls playback of audio based on the audio signal, on a basis of an image containing the scene occupying a field of view of a captured image.

(10)

The image processing device according to (9), wherein the playback control unit controls playback of audio based on the audio signal, on a basis of a size of the image containing the scene occupying the field of view.

(11)

The image processing device according to (10), wherein the playback control unit controls a volume of audio based on the audio signal, on a basis of a size of the image containing the scene occupying the field of view.

(12)

The image processing device according to any one of (9) to (11), wherein the playback control unit controls a localization of audio based on the audio signal, on a basis of a position of the image containing the scene occupying the field of view.

(13)

The image processing device according to any one of (1) to (12), further including:

an orientation analysis unit that analyzes an orientation of an image containing the scene occupying a field of view of a captured image.

(14)

The image processing device according to (13), wherein the orientation analysis unit recognizes a certain marker included in the image containing the scene and analyzes an orientation.

(15)

The image processing device according to (13) or (14), wherein when the separation unit separates the flicker pattern, the orientation analysis unit outputs information specifying a range of the image containing the scene occupying the field of view of the captured image.

(16)

The image processing device according to any one of (1) to (15), wherein the audio signal that the conversion unit converts is AM-modulated or FM-modulated.

(17)

The image processing device according to any one of (1) to (15), wherein the audio signal that the conversion unit converts is coded by a certain coding scheme.

(18)

An image display device, including:

a delay unit that delays an image signal by a certain delay time;

a flicker pattern conversion unit that converts, into a flicker pattern, an audio signal with attached information about the delay time by which the delay unit delays; and an image display unit that displays an image based on an image signal delayed by the delay unit, while also causing a backlight to emit light on a basis of the flicker pattern converted by the flicker pattern conversion unit.

(19)

An image processing method, including:

separating a flicker pattern from an image obtained by capturing, at multiple exposure times, an image containing a scene that emits light on a basis of a flicker pattern converted from an audio signal; and converting the separated flicker pattern to an original audio signal.

(20)

An image display method, including:

delaying an image signal by a certain delay time;

converting, into a flicker pattern, an audio signal with attached information about the delay time by which to delay; and displaying an image based on the delayed image signal, while also causing a backlight to emit light on a basis of the converted flicker pattern.

REFERENCE SIGNS LIST 10 video data
11 audio data signal
12 picture
20 visible light communication display
21 image/sound separation unit
22 information adding unit
23 flicker pattern conversion unit
24 backlight driving unit
25 image display unit
296 image delay unit
100 audio playback terminal
101 flicker pattern
102 playback image
103 playback audio
112 SME image sensor
113 frame memory
114 flicker decoding unit
116 audio data extraction unit
118 display
120 speaker
122 picture orientation analysis unit
124 playback control unit

The invention claimed is:

1. An image processing device, comprising:
a separation unit configured to separate a flicker pattern from an image obtained based on capture of, at multiple exposure times, an image containing a scene that emits light on a basis of a flicker pattern converted from an audio signal; and
a conversion unit configured to convert the separated flicker pattern to an original audio signal.

2. The image processing device according to claim 1, wherein
the audio signal that acts as a basis for the flicker pattern is a signal that is earlier than the image by a certain amount of time.

3. The image processing device according to claim 1, wherein
the separation unit is further configured to separate the flicker pattern from an image captured at a second exposure time that is shorter than a first exposure time.

4. The image processing device according to claim 1, further comprising an imaging unit configured to capture the image containing the scene over at least two exposure times of a first exposure time, and a second exposure time that is shorter than the first exposure time.

5. The image processing device according to claim 4, wherein the imaging unit is further configured to conduct the capture over the second exposure time at a higher frame rate than the capture over the first exposure time.

6. The image processing device according to claim 5, wherein the imaging unit is further configured to conduct the capture over the second exposure time at a higher frame rate than the capture over the first exposure time based on an execution of a sampling process on pixels in a horizontal direction when conducting the capture over the second exposure time.

7. The image processing device according to claim 5, wherein the imaging unit is further configured to conduct the capture over the second exposure time at a higher frame rate than the capture over the first exposure time based on pixel addition in a horizontal direction when conducting the capture over the second exposure time.

8. The image processing device according to claim 5, wherein the imaging unit is further configured to conduct the capture over the second exposure time at a higher frame rate than the capture over the first exposure time only in a range of pixels containing the scene occupying a field of view of a captured image.

9. The image processing device according to claim 1, further comprising a playback control unit configured to control a playback of an audio based on the audio signal, on a basis of an image containing the scene occupying a field of view of a captured image.

10. The image processing device according to claim 9, wherein
the playback control unit is further configured to control the playback of the audio based on the audio signal, on a basis of a size of the image containing the scene occupying the field of view.

11. The image processing device according to claim 10, wherein the playback control unit is further configured to control a volume of the audio based on the audio signal, on a basis of the size of the image containing the scene occupying the field of view.

12. The image processing device according to claim 9, wherein the playback control unit is further configured to control a localization of the audio based on the audio signal, on a basis of a position of the image containing the scene occupying the field of view.

13. The image processing device according to claim 1, further comprising an orientation analysis unit configured to analyze an orientation of an image containing the scene occupying a field of view of a captured image.

14. The image processing device according to claim 13, wherein the orientation analysis unit is further configured to recognize a certain marker included in the image containing the scene.

15. The image processing device according to claim 13, wherein when the separation unit is further configured to separate the flicker pattern, the orientation analysis unit is further configured to output information specifying a range of the image containing the scene occupying the field of view of the captured image.

16. The image processing device according to claim 1, wherein the original audio signal is one of AM-modulated or FM-modulated.

17. The image processing device according to claim 1, wherein the original audio signal is coded by a certain coding scheme.

18. An image display device, comprising:
a delay unit that delays an image signal by a certain delay time;
a flicker pattern conversion unit configured to convert, into a flicker pattern, an audio signal with attached information about the certain delay time; and
an image display unit configured to:
  display an image based on the image signal delayed by the delay unit; and
  cause a backlight to emit light on a basis of the flicker pattern converted by the flicker pattern conversion unit.

19. An image processing method, comprising:
separating a flicker pattern from an image obtained by capturing, at multiple exposure times, an image containing a scene that emits light on a basis of a flicker pattern converted from an audio signal; and
converting the separated flicker pattern to an original audio signal.

20. An image display method, comprising:
delaying an image signal by a certain delay time;
converting, into a flicker pattern, an audio signal with attached information about the certain delay time by which to delay; and
displaying an image based on the delayed image signal, while also causing a backlight to emit light on a basis of the converted flicker pattern.

* * * * *